United States Patent [19]

Lee et al.

[11] Patent Number: 5,603,000
[45] Date of Patent: Feb. 11, 1997

[54] INTEGRATED CIRCUIT MEMORY WITH VERIFICATION UNIT WHICH RESETS AN ADDRESS TRANSLATION REGISTER UPON FAILURE TO DEFINE ONE-TO-ONE CORRESPONDENCES BETWEEN ADDRESSES AND MEMORY CELLS

[75] Inventors: Robert D. Lee, Denton; Scott J. Curry, Coppell, both of Tex.

[73] Assignee: Dallas Semiconductor Corporation, Dallas, Tex.

[21] Appl. No.: 259,290

[22] Filed: Jun. 13, 1994

Related U.S. Application Data

[63] Continuation of Ser. No. 615,615, Nov. 19, 1990, abandoned, which is a continuation-in-part of Ser. No. 352,581, May 15, 1989, Pat. No. 5,210,846, and a continuation-in-part of Ser. No. 351,759, May 15, 1989, Pat. No. 4,982,371, and a continuation-in-part of Ser. No. 351,760, May 15, 1989, Pat. No. 5,091,771, and a continuation-in-part of Ser. No. 351,998, May 15, 1989, Pat. No. 4,972,377, and a continuation-in-part of Ser. No. 352,598, May 15, 1989, Pat. No. 4,945,217, and a continuation-in-part of Ser. No. 352,596, May 15, 1989, Pat. No. 4,948,954, and a continuation-in-part of Ser. No. 351,999, May 15, 1989, Pat. No. 5,045,675, and a continuation-in-part of Ser. No. 352,142, May 15, 1989, Pat. No. 4,995,004, and a continuation-in-part of Ser. No. 351,997, May 15, 1989, abandoned.

[51] Int. Cl.[6] ..................................................... G06F 12/00
[52] U.S. Cl. ........................................................ 395/421.11
[58] Field of Search ..................................... 395/425, 725, 395/400, 412, 421.11, 419, 182.05, 182.06; 380/3, 4; 235/380–382.5; 371/10.2, 10.3

[56] References Cited

U.S. PATENT DOCUMENTS

| 4,211,919 | 7/1980 | Ugon ........................................ 235/488 |
|---|---|---|
| 4,310,901 | 1/1982 | Harding et al. ......................... 371/10.2 |
| 4,615,006 | 9/1986 | Hirano ..................................... 395/412 |
| 4,683,372 | 7/1987 | Matsumoto .............................. 235/492 |
| 4,742,215 | 5/1988 | Daughters et al. ...................... 235/487 |
| 4,783,766 | 11/1988 | Samachisa et al. ..................... 365/185 |
| 4,802,119 | 1/1989 | Heene et al. ........................ 395/182.05 |
| 4,810,975 | 3/1989 | Dias ............................................ 331/78 |
| 4,862,501 | 8/1989 | Kamitake et al. ......................... 380/50 |
| 4,882,474 | 11/1989 | Anderl et al. ............................ 235/492 |
| 4,885,788 | 12/1989 | Takaragi et al. ........................... 380/23 |
| 4,887,234 | 12/1989 | Iijima ....................................... 395/425 |
| 4,928,001 | 5/1990 | Masada .................................... 235/380 |
| 5,043,869 | 8/1991 | Suzuki et al. ............................ 395/412 |
| 5,297,148 | 3/1994 | Harari et al. ............................ 371/10.2 |

Primary Examiner—Richard L. Ellis
Attorney, Agent, or Firm—Jenkens & Gilchrist, P.C.

[57] ABSTRACT

A low-power secure memory in which block move operations are performed without extensive write operations. A translation register holds a set of pointers which affect the address decoding. By changing the values in this special register, the logical addresses of the physical SRAM cell locations in the memory array (or arrays) to be changed without performing any write operations in the array. This avoids the charge consumption which would otherwise be required for charging and discharging bitlines as the memory cells are read and written to.

The chip of the preferred embodiment includes a scratchpad memory as well as multiple secure memories (multiple "subkeys"). The Move Block command can transfer a block of data from the Scratch Pad directly into the corresponding block location within a secure subkey, or can replace the entire contents of a secure subkey partition (including the ID and Password fields) with the entire contents of the Scratch Pad. For security purposes, the user must issue the correct Password of the subkey which is to receive the data from the Scratch Pad, and after a block has been moved from the Scratch Pad to the secure subkey, the portion of the Scratch Pad in question is erased.

10 Claims, 20 Drawing Sheets

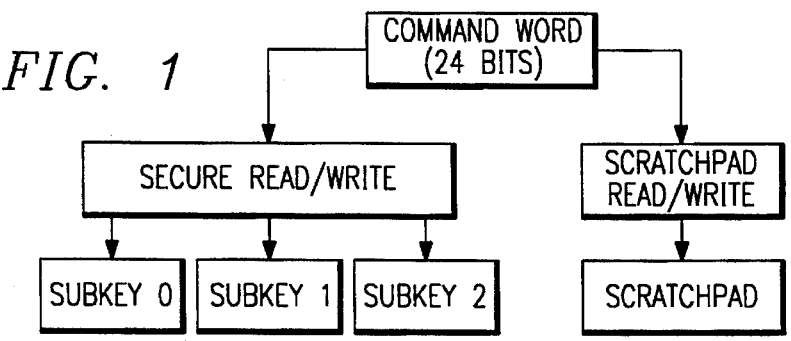
FIG. 1
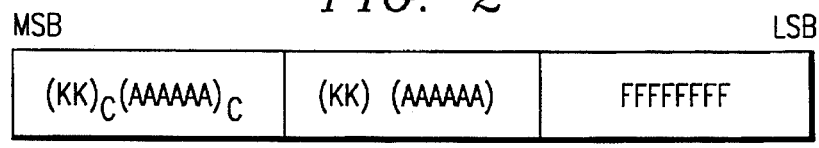
FIG. 2
FIG. 3
| COMMAND | VALID SUBKEY CODE KK | VALID BYTE ADDRESS AAAAAA | VALID COMMAND CODE FFFF FFFF |
|---|---|---|---|
| Set Scratchpad | 11 | 0 - 63 | 1001 0110 |
| Get Scratchpad | 11 | 0 - 63 | 0110 1001 |
| Set Secure Data | 00, 01, 10 | 16 - 63 | 1001 1001 |
| Get Secure Data | 00, 01, 10 | 16 - 63 | 0110 0110 |
| Set Password | 00, 01, 10 | 000000 | 0101 1010 |
| Move Block | 00, 01, 10 | 000000 | 0011 1100 |
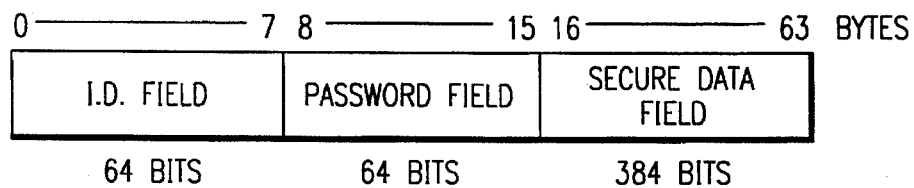
FIG. 4

| BLOCK NUMBER | BYTE ADDRESS IN: SCRATCHPAD | SUBKEY |
|---|---|---|
| 0 | 0-7 | 0-7 (I.D.) |
| 1 | 8-15 | 8-15 (PASSWORD) |
| 2 | 16-23 | 16-23 (PASSWORD) |
| 3 | 24-31 | 24-31 (SECURED) |
| 4 | 32-39 | 32-39 (SECURED) |
| 5 | 40-47 | 40-47 (SECURED) |
| 6 | 48-55 | 48-55 (SECURED) |
| 7 | 56-63 | 56-63 (SECURED) |

| BLOCK NUMBER | SELECTOR CODE |
|---|---|
| 0 | 4C69 6E64 9DB3 9A9A (H) |
| 1 | 4C69 919B 624C 9A9A (H) |
| 2 | 4C96 6E9B 62B3 659A (H) |
| 3 | 4366 616B 6D43 6A6A (H) |
| 4 | BC99 9E94 92BC 9595 (H) |
| 5 | B369 9164 9D4C 9A65 (H) |
| 6 | B396 6E64 90B3 6565 (H) |
| 7 | B396 919B 624C 6565 (H) |
| ALL BLOCKS | 7FFA 5D57 517F 5656 (H) |

FROM FIG. 22A-1

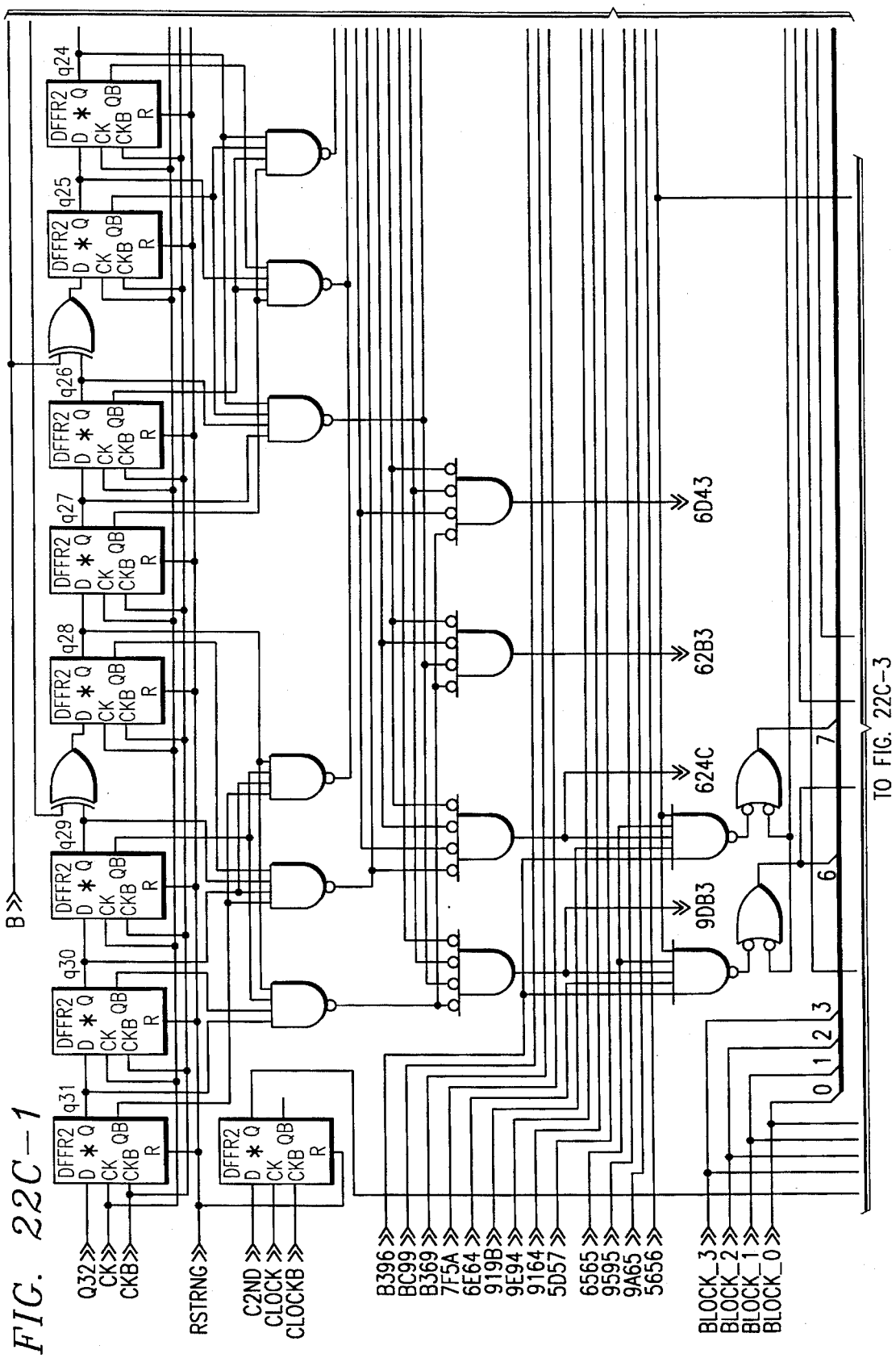

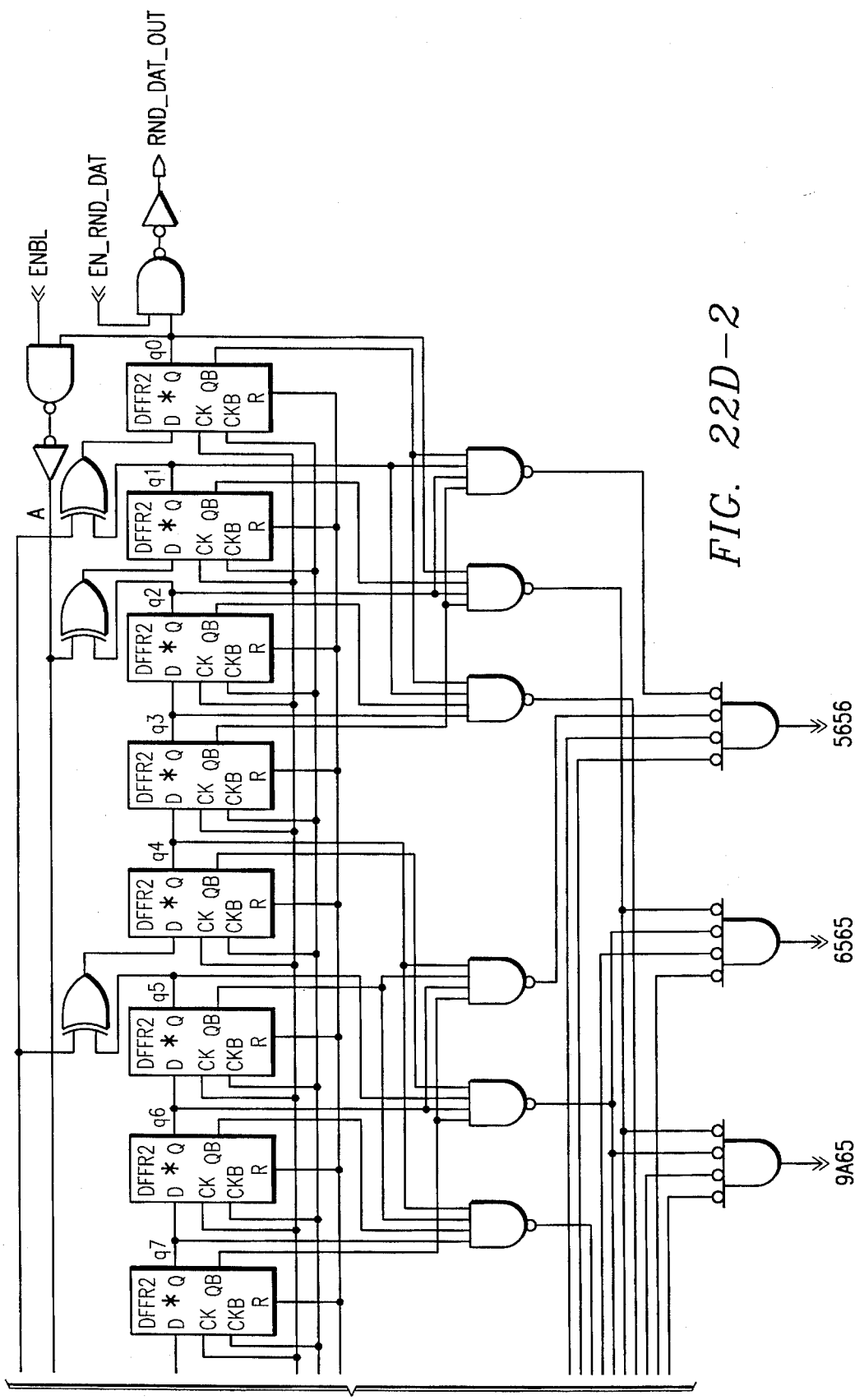

INTEGRATED CIRCUIT MEMORY WITH VERIFICATION UNIT WHICH RESETS AN ADDRESS TRANSLATION REGISTER UPON FAILURE TO DEFINE ONE-TO-ONE CORRESPONDENCES BETWEEN ADDRESSES AND MEMORY CELLS

CROSS-REFERENCE TO OTHER APPLICATIONS

The present application is a continuation of Ser. No. 07/615,615 filed on Nov. 19, 1990. The present application also is a continuation-in-part application, claiming priority from the following commonly-owned U.S. applications, all filed on May 15, 1989, and all hereby incorporated by reference: Ser. No. 352,581, "one-Wire Bus Architecture" (DSC-83), now U.S. Pat. No. 5,210,846; Ser. No. 351,759, "Compact Electronic Module" (DSC-85), now U.S. Pat. No. 4,982,371; Ser. No. 351,760, "Compact Package for Electronic Module" (DSC-86), now U.S. Pat. No. 5,091,771; Ser. No. 351,998, "Low-voltage Low-power Static RAM" (DSC-107), now U.S. Pat. No. 4,972,377; Ser. No. 352,598, "Hand-held Wand for Reading Electronic Tokens" (DSC-157), now U.S. Pat. No. 4,945,217; Ser. No. 352,596, "Interface for Receiving Electronic Tokens" (DSC-158), now U.S. Pat. No. 4,948,954; Ser. No. 351,999, "Serial Port Interface to Low-voltage Low-power Data Module" (DSC-159), now U.S. Pat. No. 5,045,675; Ser. No. 352,142, "RAM/ROM Hybrid Memory Architecture" (DSC-160), now U.S. Pat. No. 4,995,004; and Ser. No. 351,997, "Modular Data System" (DSC-161), now abandoned.

The present application also claims priority from PCT application PCT/US90/02891, filed May 15, 1990 (DSC-83PCT), which is hereby incorporated by reference.

It is also noted that the following applications, of common assignee and common effective filing date with the present application, contain at least some drawings in common with the present application:

Ser. No. 615,606, filed Nov. 19, 1990, entitled "Electronic Key with Repeatable False Responses" (DSC-303);

Ser. No. 615,608, filed Nov. 19, 1990, entitled "Electronic Key with Multiple Subkeys Writable Via Scratchpad" (DSC-305);

Ser. No. 615,618, filed Nov. 19, 1990, entitled "Low-Power Integrated Circuit with Selectable Battery Modes" (DSC-306); all of which are hereby incorporated by reference.

PARTIAL WAIVER OF COPYRIGHT

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the. United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

BACKGROUND OF THE INVENTION

The present invention relates to low-powered integrated circuit memories, and particularly to integrated circuits having secure memory therein.

Battery-Backed Integrated Circuits

Compact batteries are increasingly used inside integrated circuit packages or in very small modules, to provide nonvolatile data retention. In such packages and modules, the availability of battery backup can be used to ensure that power outages or power-line noise cannot cause loss of data (including configuration data). For example, modern semiconductor technology has provided solid-state memories with such low standby power requirements that a single coin-sized battery can power the memory for ten years of lifetime or more. Such memories are already commercially available.

The very rapid progress of integrated circuit complexity generally, and the general use of CMOS processing, have permitted a huge increase in the functionality which can be included in a very compact portable system. However, power supply capabilities have not advanced as rapidly. Battery technology has provided a relatively slow increase in the amount of energy which can be stored per unit weight (or per unit volume). Thus, in order to provide complex functionality in a small portable module, a very high degree of power efficiency has become an enabling technology.

Low-Power Memories

Conventional CMOS static memories have developed to the point where their standby power consumption is extremely small. The low power consumption of CMOS is extremely advantageous in a wide variety of environments, and is one of the reasons why CMOS logic has become very widely used for a wide variety of digital circuits. Low power consumption is not only advantageous where the total drain on system power supply must be conserved (as, for example, in applications where the power is being supplied from a battery), but also implies that the power dissipation on-chip will be less. This can be important in a wide variety of applications where a very high density is required.

In a conventional CMOS SRAM, six transistors are used in each cell. Four of these transistors form a latch (i.e. a pair of cross-coupled inverters), which has two data nodes with opposite logic states. Each node is connected to ground through an NMOS driver transistor. The driver transistor which connects each node to ground has its gate connected to the opposite data node so that, when one data node goes high, it will pull the opposite data node low by turning on its driver transistor. Similarly, each node is connected, through a PMOS pull-up transistor, to the high supply voltage $V_{DD}$ (which is typically 5 volts). Again, the data nodes are connected to control the pull-up transistors of the opposite data node, so that, when one of the data nodes goes low, it will turn on the pull-up transistor of the opposite node, so that the opposite node is held high. In addition, two pass transistors (normally NMOS transistors) selectively connect the two data nodes to a pair of bit lines. (The gates of the pass transistors are connected to a word line, so that the cell nodes will be connected to the bit line pair only if the word line goes high.) Such a 6-transistor cell will hold its logic state indefinitely (as long as the supply voltages are maintained and no transient upset occurs). Moreover, while such a cell is simply holding data, it has almost zero power consumption, since each of the nodes will be disconnected from one of the two power supply voltages. Thus no current flows, except for the very small currents caused by junction leakage. (Currents do flow when read or write operations are occurring, and therefore the power consumption of an active cell is much higher.)

However, even higher power efficiencies would be useful. Many system designs have begun to make use of the low standby power consumption of CMOS memory, to provide nonvolatile memory by attaching a very small battery. For example, many personal computers contain a battery-backed clock/calendar, which continues to keep time and date information when the computer is switched off. Many portable applications have also begun to use significant amounts of memory. In such applications, battery lifetime is one of the key performance parameters, from the end-user's point of view. If an integrated circuit which is sold for use in such systems turns out to consume more power than specified, so that the system batteries are exhausted early, this could be very unwelcome to the end-user. A further important class of applications is in packaging an integrated circuit, which includes some memory functions, together with a very small battery. The power supplied by the battery is used to preserve the data in memory while the system power supply is turned off. Thus, this arrangement permits the full advantages of nonvolatile memory to be achieved, without incurring the penalties of high-voltage circuitry and slow write time (as in EPROM or EEPROM floating-gate technology).

Address Remapping

In the type of computer systems known as "virtual memory" systems, the range of addresses which can be specified is much larger than the amount of physical memory which is actually present. The software can access data by specifying a logical address, without ever having to find out what physical address the logical address corresponds to. (Of course, the translation of logical address to physical address must be done consistently from one access to another.) Thus, at each memory access, the logical address specified by software must be translated into a physical memory address, which can be used for actually selecting RAM chips (or other memory devices). A wide variety of circuits have long been used for translating logical addresses into physical memory addresses.

SUMMARY OF THE INVENTION

The present application sets forth several novel points. Some novel teachings will now be summarized, but this does not imply that other novel teachings are not present.

An obvious and predictable source of power loss in memories is the leakage currents which inevitably exist. However, in modern CMOS architectures, this loss has been reduced to a very low level. The present invention focusses on a different source of power loss.

Whenever a circuit node is charged up, energy must be drawn (directly or indirectly) from the battery (or other power supply).[1] This "charge-pumping" energy consumption is uncontrollable in some cases: for example, when a memory is being read, it must expend a certain minimum energy for each line being driven to a high state.

[1] When a node is charged up, the required energy input is at least $\frac{1}{2}C_L(V_\Delta)^2$, where $C_L$ is the line capacitance, and $V_\Delta$ is the voltage rise required to reach a logic "high" state. Physically, this energy is only dissipated when the node is eventually discharged; but for quick analysis, it is more permissible to track the charging events rather than the discharging events. In addition, when a node is charged or discharged, energy is dissipated by resistive losses from any parasitic intervening circuit resistance $R_{para}$. An even simpler analysis is simply to consider battery lifetime as specified simply as a quantity of charge at a rated voltage. This gives a very simple model, which is reasonably accurate as long as the currents do not become very large.

The present invention provides a novel way to reduce charge-pumping energy consumption in some cases.

Low-Power Secure Memory with Block Move Operations

The present invention provides a low-power memory (preferably a secure memory) in which block move operations (memory-to-memory transfers) are performed without extensive write operations. A special translation register holds a set of pointers which (in combination with the associated translation logic) affect the address decoding. By changing the values in this register, the logical addresses of the physical SRAM cell locations in the memory array (or arrays) to be changed without performing any write operations in the array. This avoids the charge consumption which would otherwise be required for charging and discharging bitlines as the memory cells are read and written to.

The chip of the preferred embodiment includes a scratch-pad memory as well as multiple secure memories (multiple "subkeys"). The Scratch Pad is organized into eight blocks of eight bytes each. In order to prevent accidental moving and erasure of the wrong data, the nine 64-bit Block Selector Codes were chosen such that there is a minimum 32-bit difference between any two code words. The Move Block command is designed to place a block of data which has been previously written to the Scratch Pad directly into the corresponding block location within a secure subkey, or to replace the entire contents of a secure subkey partition (including the ID and Password fields) with the entire contents of the Scratch Pad. For security purposes, the user must issue the correct Password of the subkey which is to receive the data from the Scratch Pad, and after a block has been moved from the Scratch Pad to the secure subkey, the portion of the Scratch Pad in question is erased. This implies that the data which was replaced in the secure subkey is erased and the new data can only be accessed through the subkey.

In the presently preferred embodiment, each block of memory corresponds to one row of cells in the memory array. This is particularly convenient, since all bits in a block will normally be read at more or less the same time, and therefore the word line for a selected block can simply be held high while the block is read. Again, this reduces charge consumption.

Hardware Pointer-Checking Circuit

The integrated circuit of the presently preferred embodiment provides reduced power consumption, by the use of remappable memory-block-allocation pointers. Normally, one logical pointer will point to one physical block of memory cells, and each block of memory cells will be pointed to by a unique logical pointer.

However, this arrangement is subject to some risk: if the pointer assignments ever become scrambled, then it might be possible for some blocks to be pointed to by no pointers, or by two or more pointers. Data in a physical block of memory which was not pointed to (did not have a logical address) could be lost (even though the data was still present in the latches of the memory cells it was written into). In a physical block of memory which was pointed to by two or more pointers, data errors would occur.

Another of the inventive teachings set forth herein provides a hardware check circuit, which continuously monitors the full set of pointers to ensure internal consistency. Thus, if the set of pointers ever becomes scrambled (e.g. due to an interrupted write or an electrostatic spike), the hardware check circuit will detect this, and generate a reset signal which sends the memory back to its default state.

In the integrated circuit of the presently preferred embodiment, the Lookup RAM contains the pointers which keep track of successive Block Move memory swaps. Because of the structure of the memory in the DS1205 (four partitions of 512 bits each; each partition divided into eight blocks [rows] of 64 bits each) the Lookup RAM is divided into eight blocks, each of which points to four rows—each row corresponding to one of the subkeys or the Scratch Pad. So, for example, Block 0 of the Lookup RAM contains four pointers, each one of which points to Block (Row) 0 of a subkey or the Scratch Pad. When the part is initialized (battery attach) these pointers are aligned as follows:

00—Subkey 0
01—Subkey 1
10—Subkey 2
11—Scratch Pad

When a Move Block command is issued, the actual RAM does not change its physical location. Rather, the pointers associated with the specified block simply exchange addresses within the appropriate block of Lookup RAM. For example, if a Move Block command is issued and Block 0 of subkey 1 is specified, then the above addresses for Lookup RAM Block 0 would read:

00—Subkey 0
01—Scratch Pad
10—Subkey 2
11—Subkey 1

Since each pointer address corresponds to a row (64 bits) of RAM, it is imperative that there be no address redundancies within a given block of Lookup RAM as a redundancy would imply that one row is not being addressed at all. Therefore it was necessary to include within each of the eight blocks of Lookup RAM a circuit which would monitor the states of the pointers and guarantee uniqueness of the four addresses. This circuit is shown in FIG. 23C. It consists of an array of p-channel devices which forces a reset condition upon detection of an illegal, or redundant, state. This reset signal re-initializes the pointer addresses only of the Lookup RAM block in question to their power-up state. This series of events will rearrange the user data between the subkeys (assuming any Move Block commands have been issued), but it will allow user access to the entire RAM, whereas one or more rows might have been rendered inaccessible had the redundancy been allowed.

BRIEF DESCRIPTION OF THE DRAWING

The present invention will be described with reference to the accompanying drawings, which show important sample embodiments of the invention and which are incorporated in the specification hereof by reference, wherein:

FIG. 4 shows the data organization of the multiple subkeys of the electronic key chip of the presently preferred embodiment.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Overall Description of the Sample Embodiment

The DS1205 MultiKey is an enhanced version of the DS1204U Electronic Key which has both a standard 3-wire interface, data, clock, and reset, and a 1-wire "touch" interface. The DS1205 MultiKey has three secure read/write subkeys which are each 384 bits in length. In addition, there is a 512-bit read/write scratchpad which can be used as a non-secure data area or as a holding register for data transfer to one of the three subkeys. Each subkey within the part is uniquely addressable.

Operation

Figures 1, 22A:
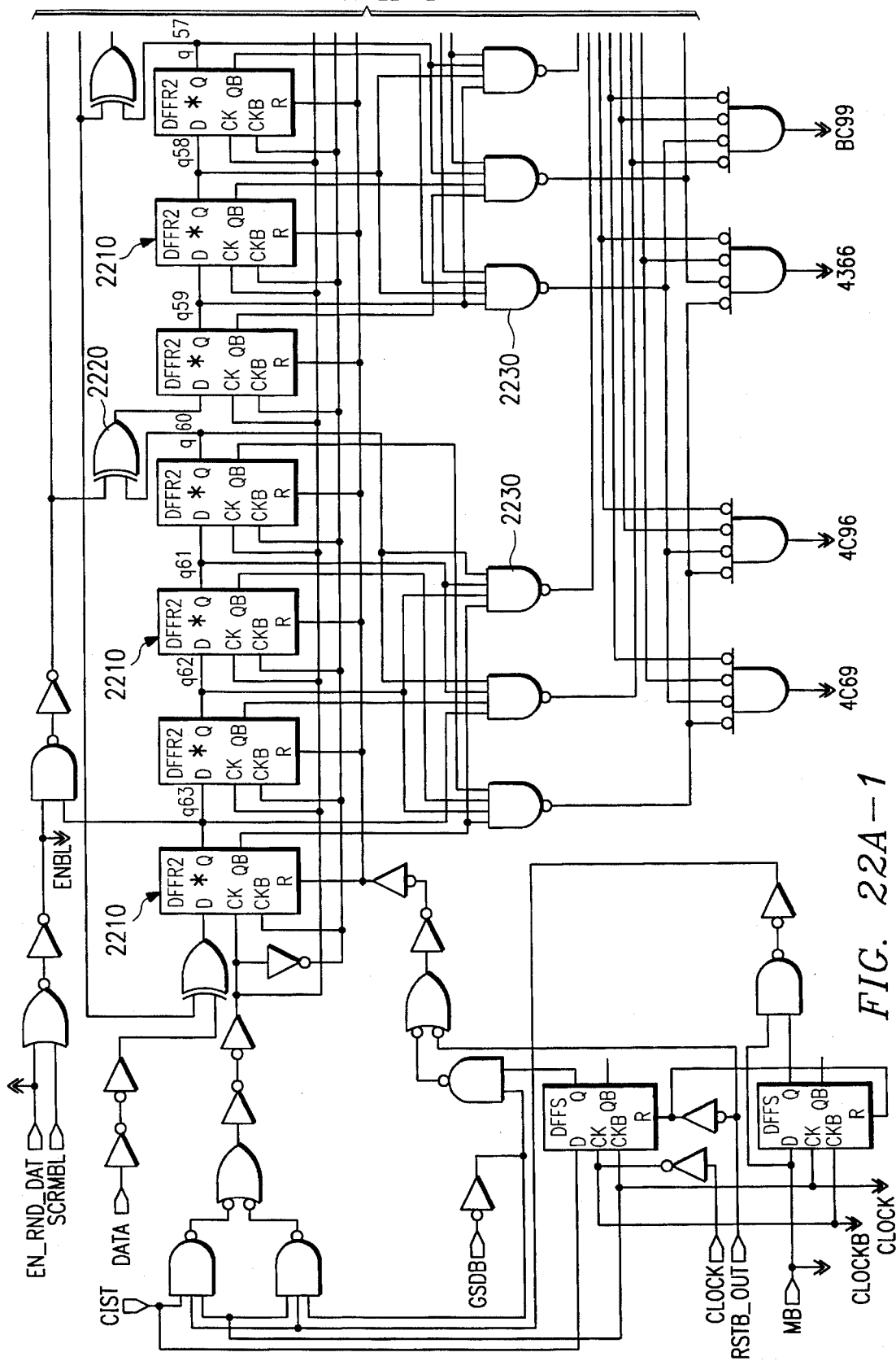
FIG. 1 schematically shows the writing of a command word to the electronic key chip of the presently preferred embodiment.
FIGS. 22A, 22B, 22C, and 22D show circuitry which is essentially the same as that used, in the presently preferred embodiment, for decoding command words and also for pseudo-random number generation.

The writing of a command word to the DS1205 MultiKey specifies the operation to be performed and the subkey to be operated on. There are two classes of operations available for the DS 1205 MultiKey. These are operations which access one of the three secure read/write subkeys and operations which access the read/write scratchpad (FIG. 1).

Command Word

Figures 2, 22A:
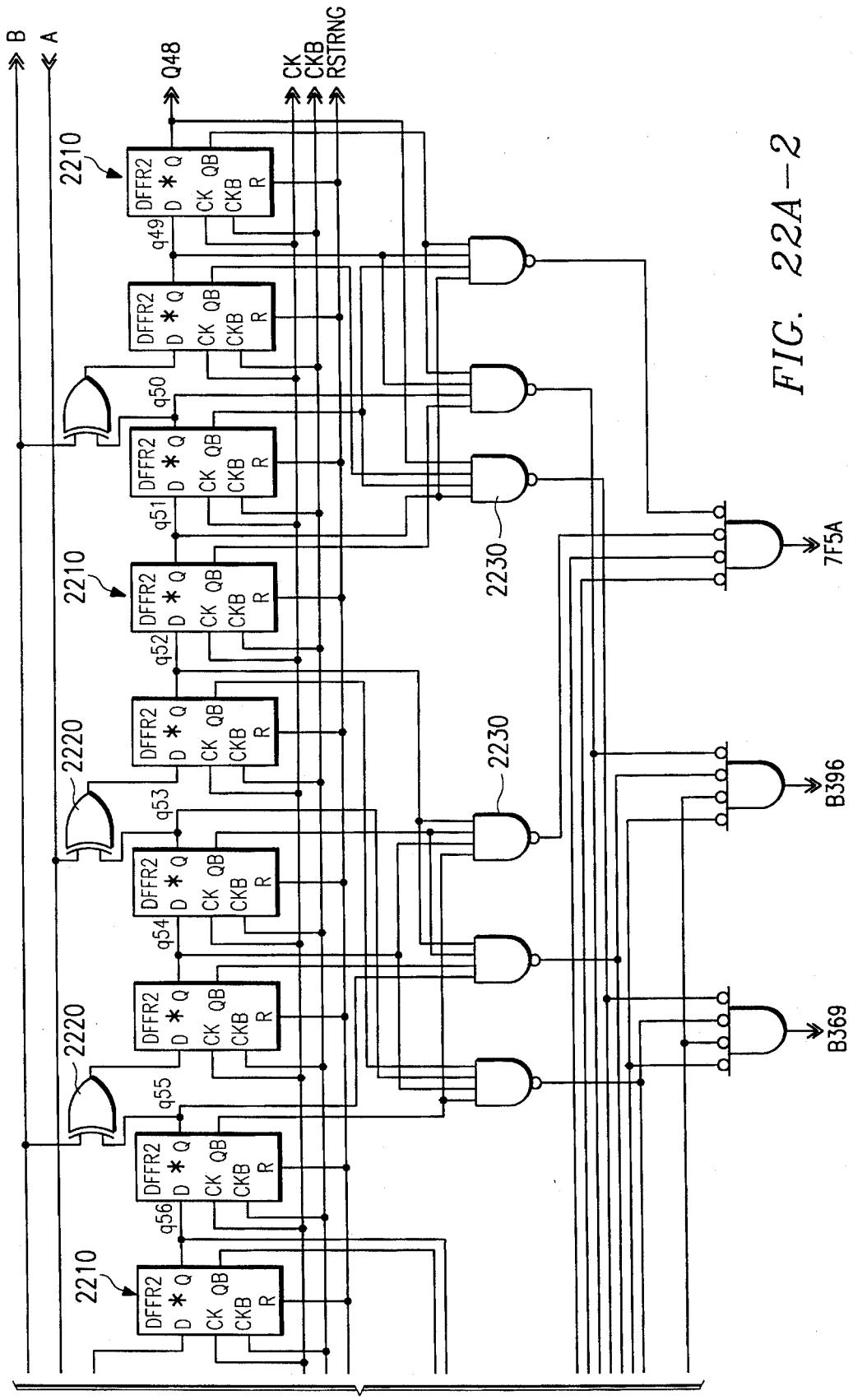
FIG. 2 shows the field organization of the 24-bit command word, in the presently preferred embodiment.
Figures 1, 22B:
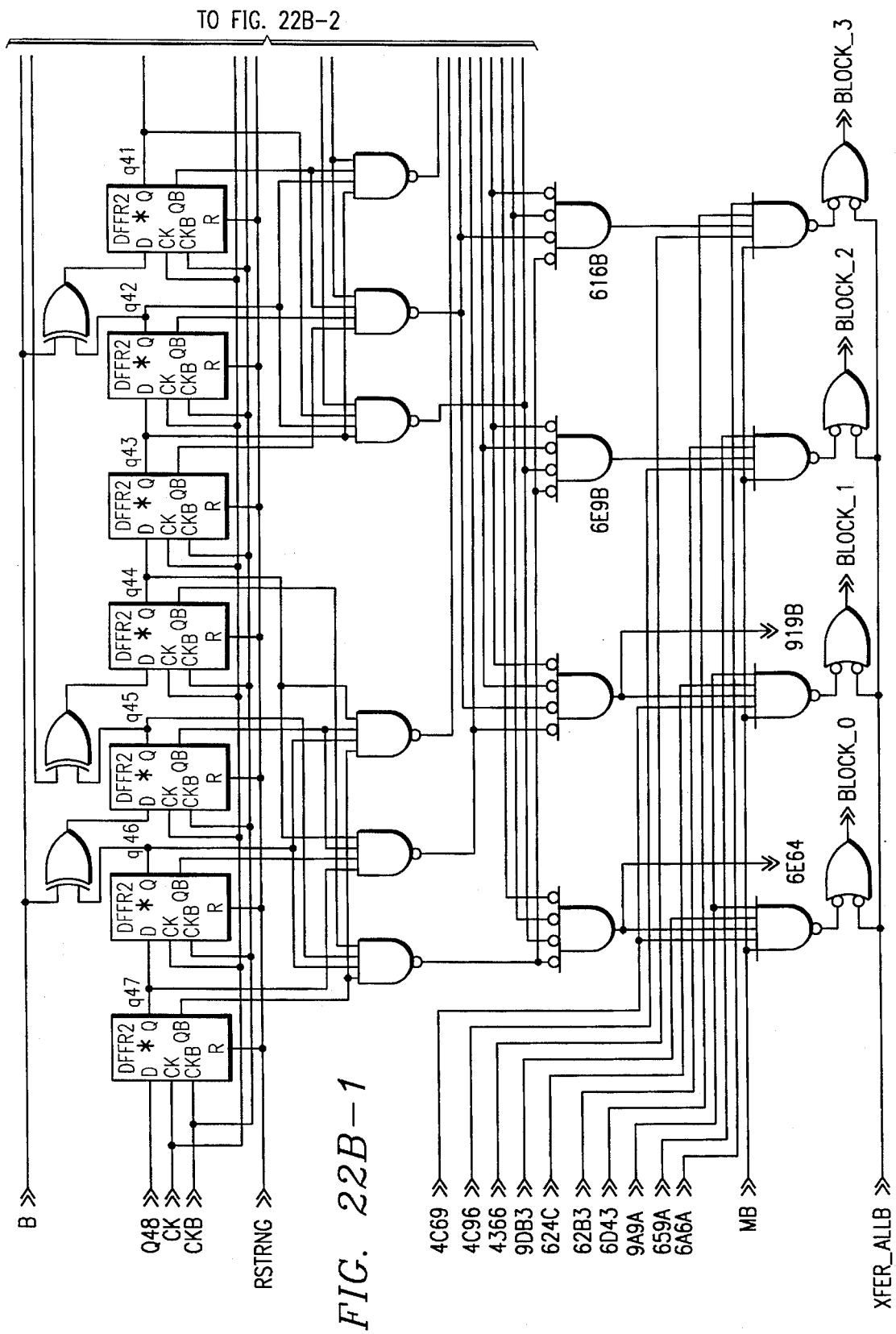
Figures 2, 22B:
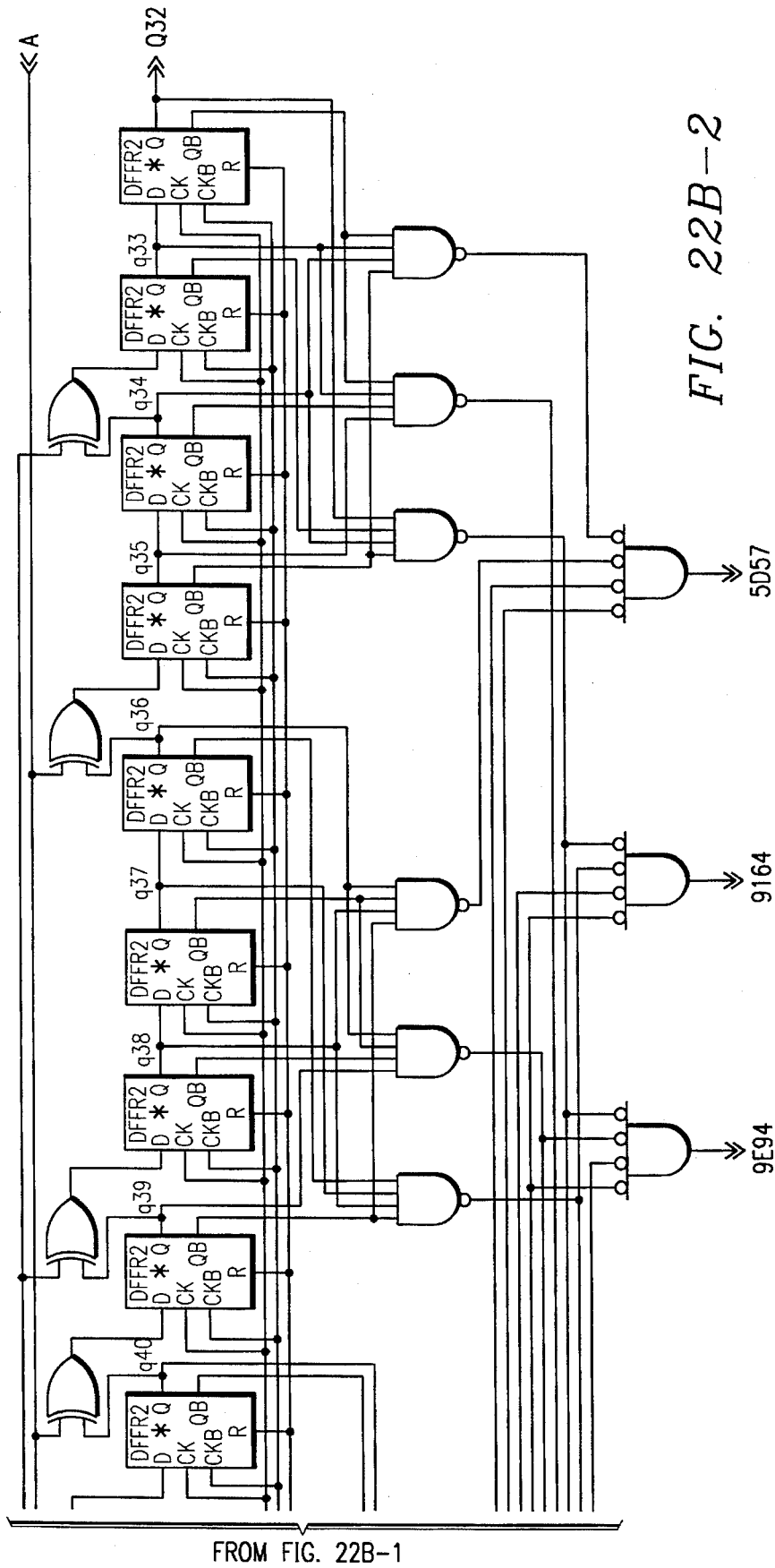
Figures 2, 22C:
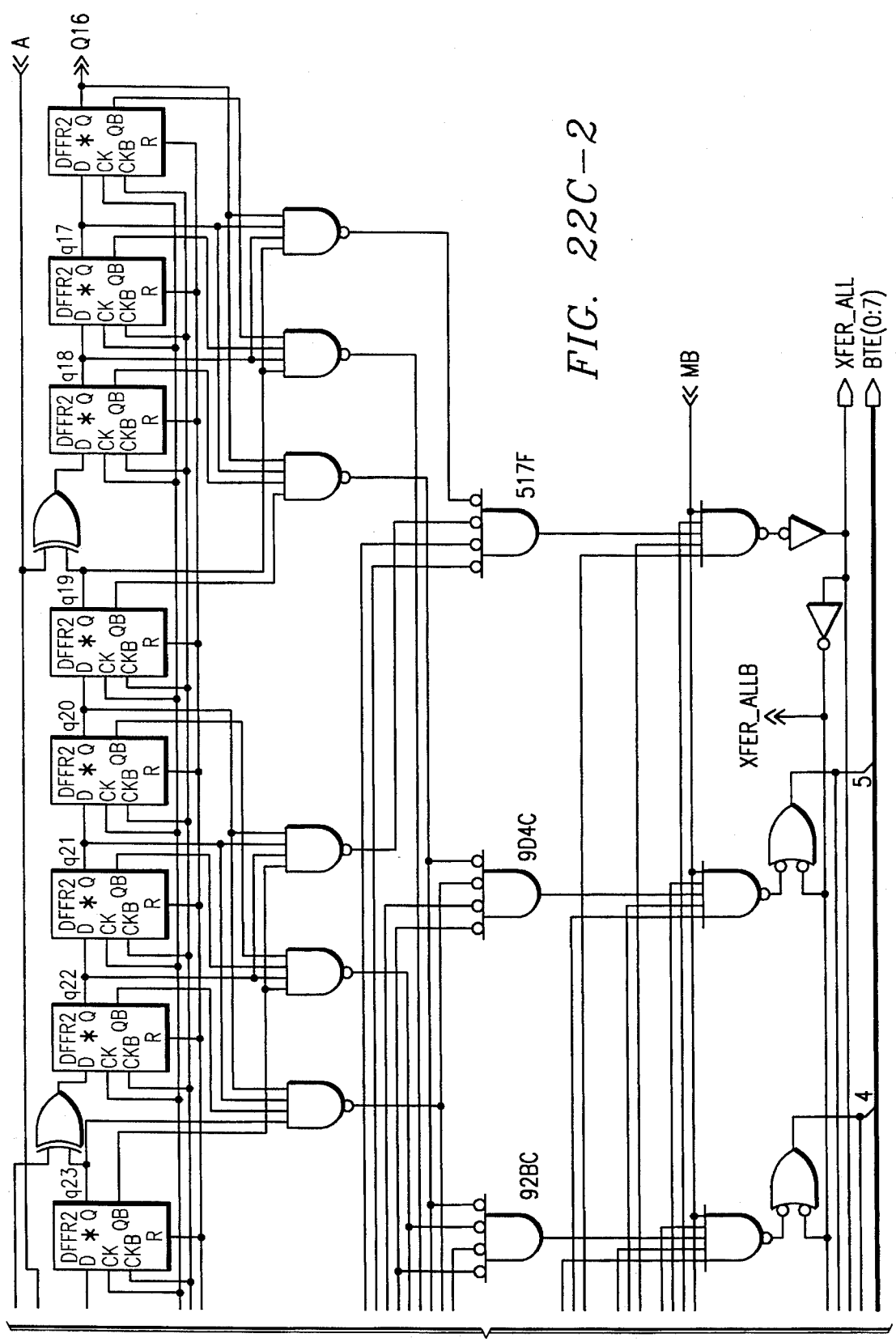

The 24-bit command word is grouped into three fields of eight bits each. These byte-sized fields specify the subkey which is to be accessed, the starting byte address for the data transfer operation, and the type of command to be performed. The starting byte address and the subkey identifier fields are required to be given in both true and complement form. If these values do not match, the access to the part will be terminated (FIG. 2).

Figures 3, 22C:
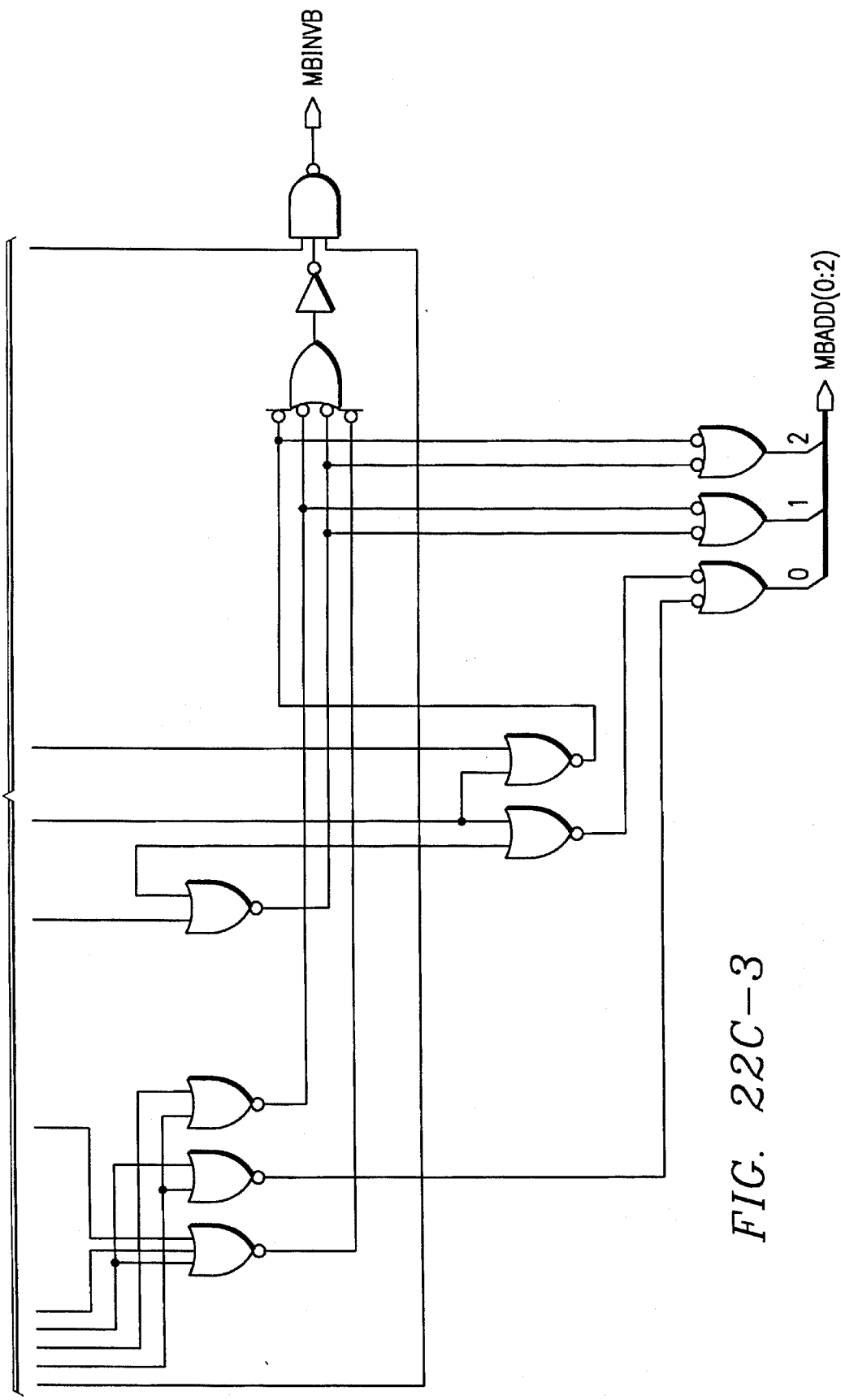
FIG. 3 illustrates the subkey codes used in the presently preferred embodiment.
Figures 1, 22D:
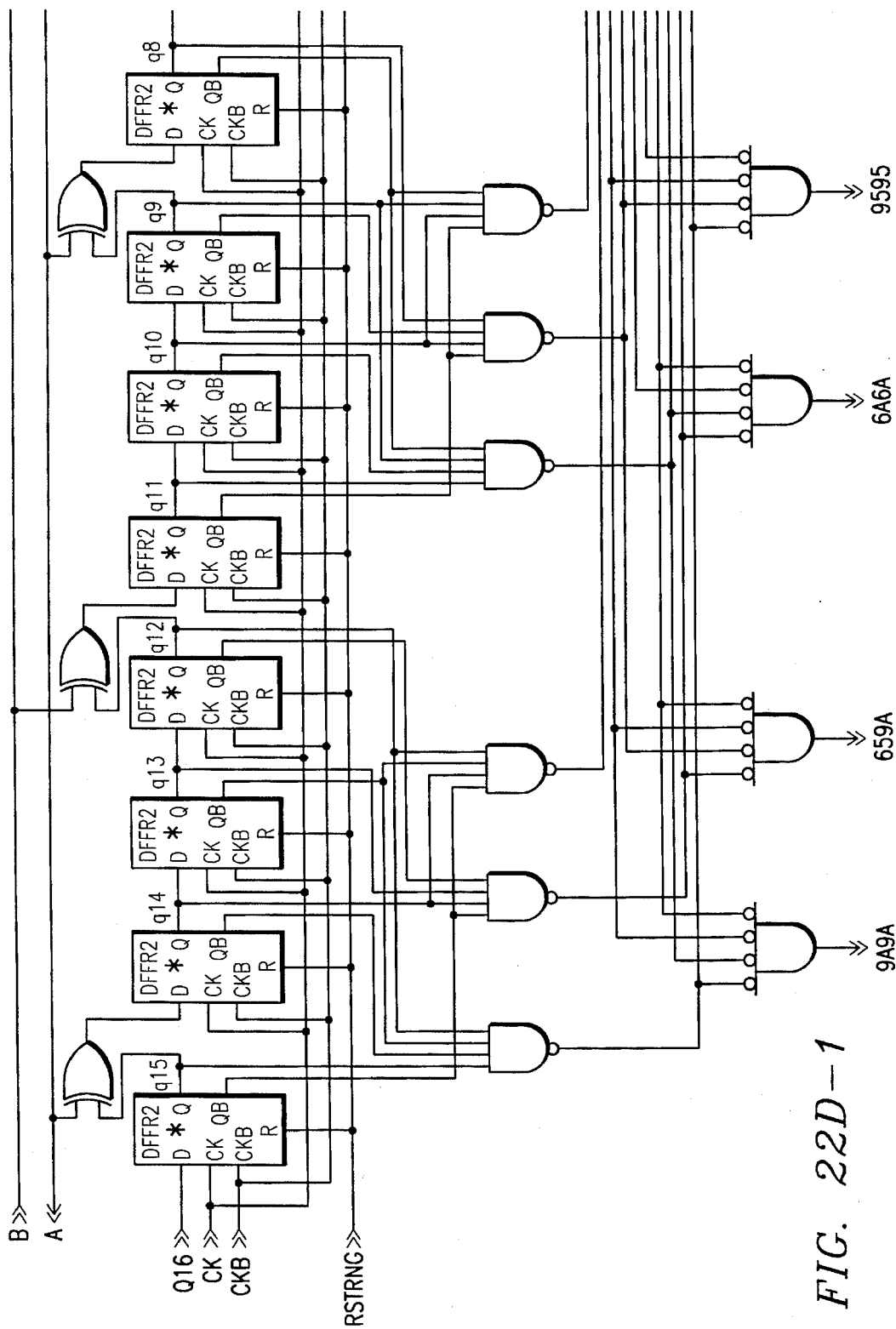

The first byte of the command word is made up of the complement of the 2-bit subkey code, identifying which subkey is being accessed, and the complement of the 6-bit address field, which specifies the starting byte address of the given subkey to be accessed. The second byte of the command word consists of the 2-bit subkey code and the 6-bit starting byte address. The third byte of the command word is the 8-bit function code which defines which of the six commands is to be executed. Each command is subkey- and address-specific and, as such, each command precludes the use of certain subkey codes and starting address locations. FIG. 3 illustrates the subkey codes, starting address locations, and function codes that are valid for each of the six command operations.

Secure Subkey Commands

Each secure subkey within the DS1205 MultiKey is comprised of a 64-bit ID field, a 64-bit password field, and a 384-bit secured data field (FIG. 4). The three commands which operate on the secure subkeys are as follows:

1) Set password
2) Set secure data
3) Get secure data

Set Password

Figure 5:
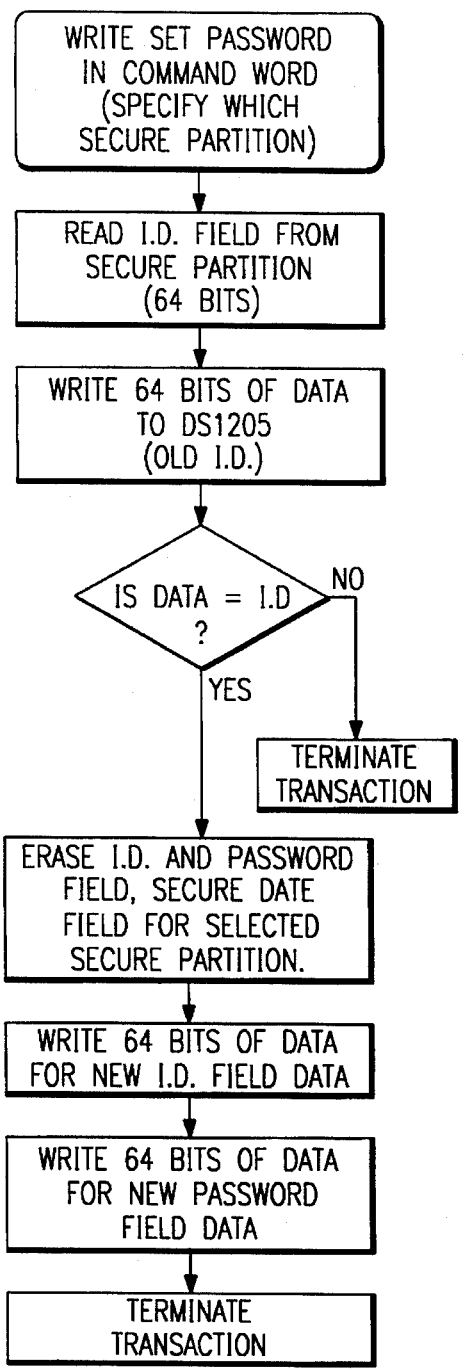
FIG. 5 shows the sequence of operations when a Set Password command is received, in the electronic key chip of the presently preferred embodiment.

The Set Password command is used to enter data into the I.D. field and the password field of the selected subkey. Upon recognition of the correct I.D., the DS1205 MultiKey will erase the entire contents of the selected subkey and proceed to rewrite the 64-bit I.D. field and the 64-bit password field. The flow sequence is shown in FIG. 5.

Set Secure Data

Figure 6:
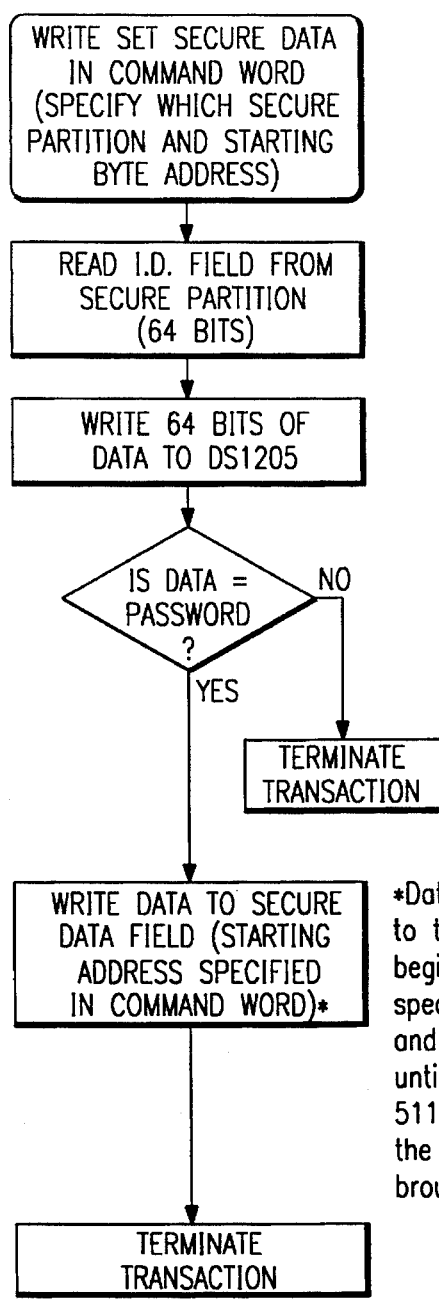
FIG. 6 shows the sequence of operations when a Set Secure Data command is received, in the electronic key chip of the presently preferred embodiment.

The Set Secure Data command is used to enter data into the selected subkey. The first 64 bits of the data stream will be a read of the I.D. field from the selected subkey. The next 64 bits of the data stream must contain the password for the selected subkey. If the received password does not match the password field for the selected subkey, the DS 1205 Multi-Key will terminate the transaction immediately. The flow sequence is shown in FIG. 6.

Get Secure Data

Figure 7:
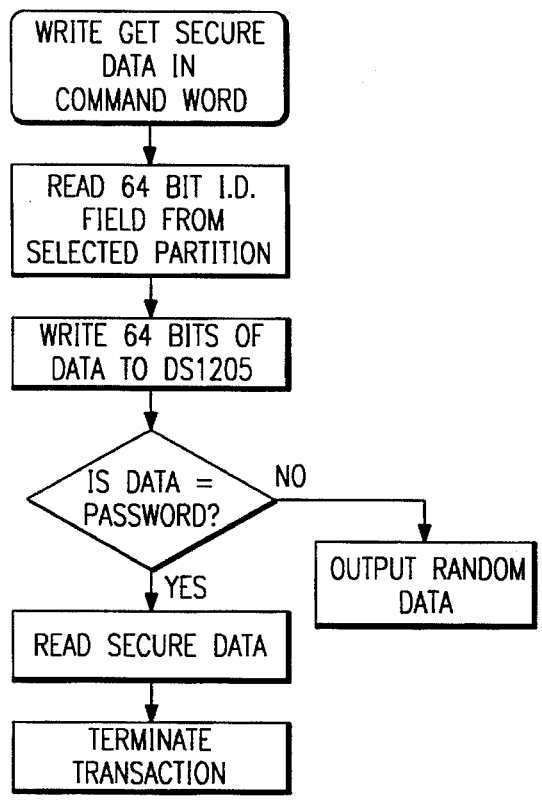
FIG. 7 shows the sequence of operations when a Get Secure Data command is received, in the electronic key chip of the presently preferred embodiment.

The Get Secure Data command is used to retrieve secured data from the selected subkey. The 64-bit I.D. field of the selected subkey must be read by the host. The password for the selected subkey must then be transmitted to the DS1205 MultiKey immediately after the command word. If the received password fails to match the password field for the selected subkey, the DS1205 MultiKey will output randomly generated data instead of the secured data. The flow sequence is shown in FIG. 7.

Scratchpad Read/write Commands

The 512-bit Read/Write Scratchpad of the DS1205 MultiKey is not password-protected and is accessible beginning at any byte boundary. The scratchpad can be used to store unsecured data or it can be used to build up a data structure which can be verified and then transferred to a secure subkey. The three commands which operate on the read/write scratchpad are as follows:

1) Set scratchpad data
2) Get scratchpad data
3) Move block

Set Scratchpad Data

Figure 8:
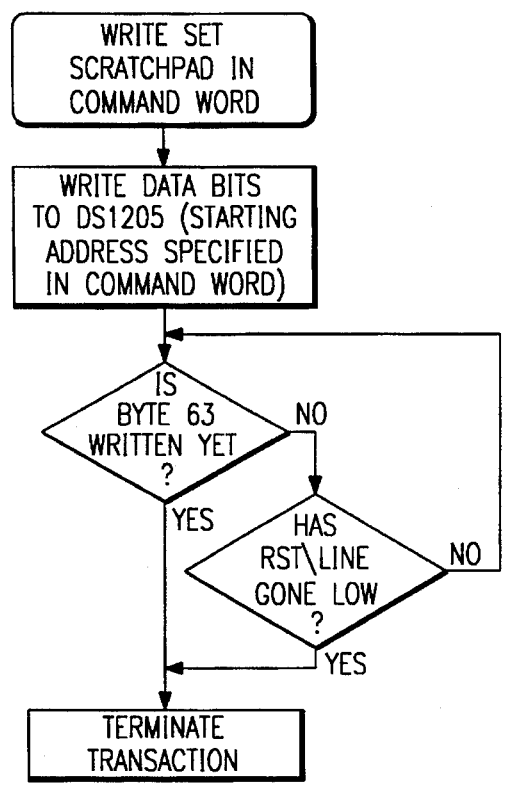
FIG. 8 shows the sequence of operations when a Set Scratchpad Data command is received, in the electronic key chip of the presently preferred embodiment.

The Set Scratchpad Data command is used to enter data into the DS1205 MultiKey scratchpad. The command word must specify the starting byte address for the data transfer. Valid byte addresses are 0 through 63. The DS1205 Multi-Key will write data to the scratchpad until byte 63 has been written or until the RST\ line goes to a logic low level. The flow sequence is shown in FIG. 8.

Get Scratchpad Data

Figure 9:
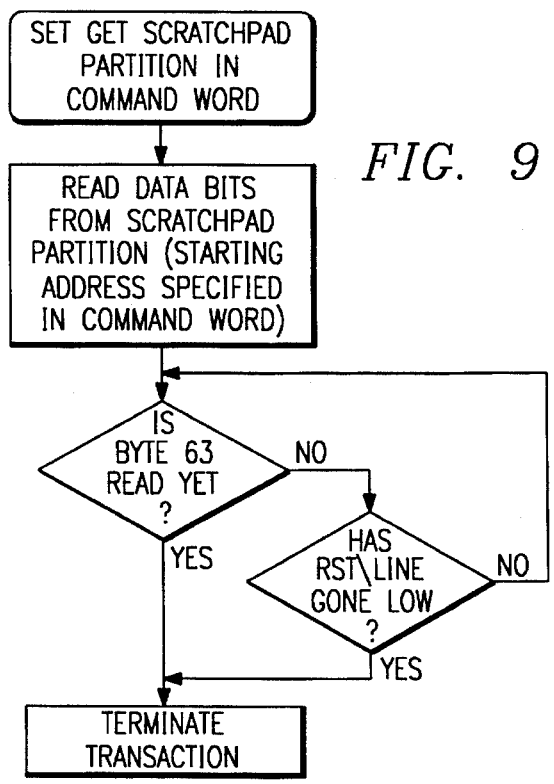
FIG. 9 shows the sequence of operations when a Get Scratchpad Data command is received, in the electronic key chip of the presently preferred embodiment.

The Get Scratchpad data command is used to retrieve data from the 512-bit scratchpad. The command word must specify the starting byte address for the data retrieval. Valid byte addresses are 0 through 63. The DS1205 MultiKey will retrieve data from the scratchpad until byte 63 has been read or the RST\ line goes to a logic low level. The flow sequence is shown in FIG. 9.

Move Block

Figures 10, 11, 12:
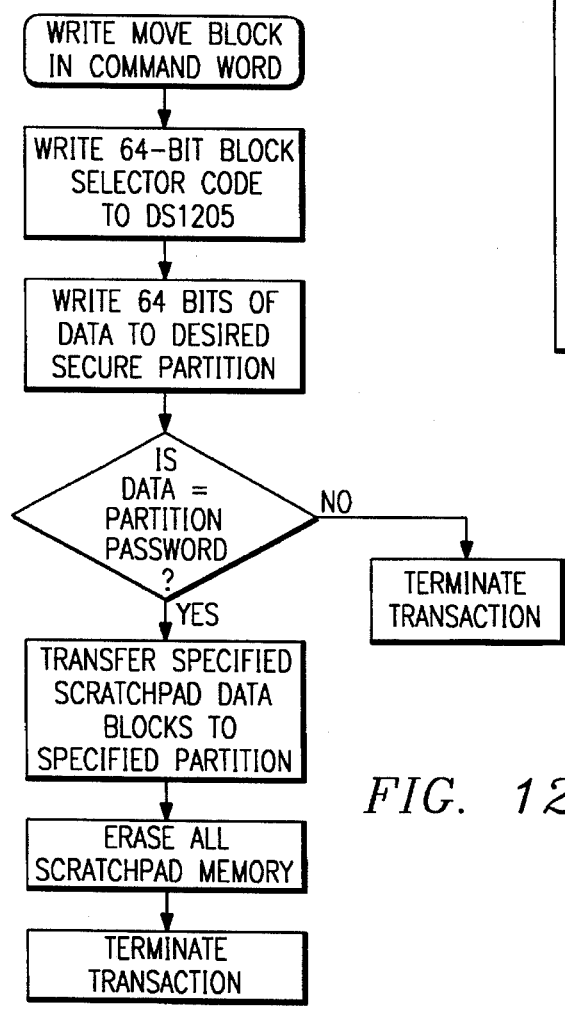
FIG. 10 shows the address map for block selection.
FIG. 11 shows block selector codes.
FIG. 12 is a flow diagram for the move block operation.

The Move Block command is used to transfer data, which has been previously entered into the scratchpad and verified, to one of the three secure subkeys. Data can be transferred as one large block of 512 bits or it can be transferred in blocks of 64 bits each (FIG. 10). There are nine valid block selectors which are used to specify which block or blocks are to be transferred (FIG. 11). As a further precaution against accidental erasure of a secure subkey, the 64-bit password of the destination subkey must be entered and match the destination subkey. If the passwords fail to match, the operation is terminated. The flow sequence is shown in FIG. 12.

1-Wire Interface

When The "touch" interface is used, all communications to and from the DS1205 MultiKey are accomplished via a single interface lead. Data is read and written through the use of time slots to manipulate bits and a command word to specify the transaction.

Write Time Slots

A write time slot is initiated when the host pulls the data line from a high logic level to a low logic level. There are two types of write time slots: Write One time slots and Write Zero time slots. All write time slots must be a minimum of 60 uS and a maximum of 120 uS in duration. There is a minimum of a 1 uS valid access recovery time between time slots.

Figure 13:
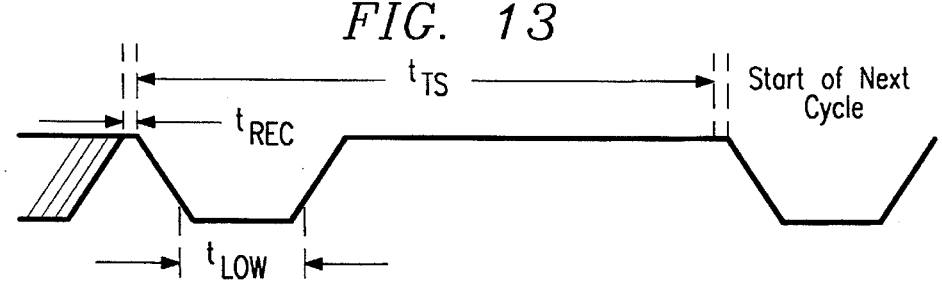
FIG. 13 shows the timing of a Write One time slot on the one-wire bus, in the presently preferred embodiment.

For the host to generate a Write One time slot, the data line must be pulled to a logic low level and then released, allowing the data line to pull up to a high level within 15 uS after the start of the write time slot (see FIG. 13).

Figure 14:
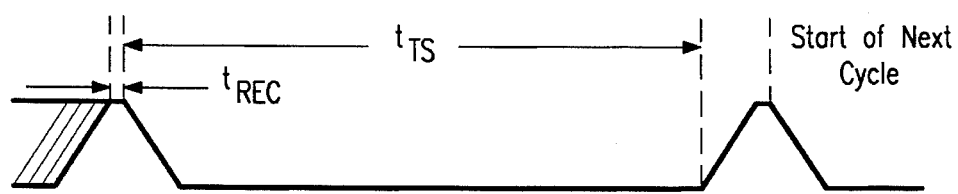
FIG. 14 shows the timing of a Write Zero time slot on the one-wire bus, in the presently preferred embodiment.

For the host to generate a Write Zero time slot, the data line must be pulled to a logic low level and remain low for the duration of the write time slot (see FIG. 14).

Read Time Slots

Figure 15:
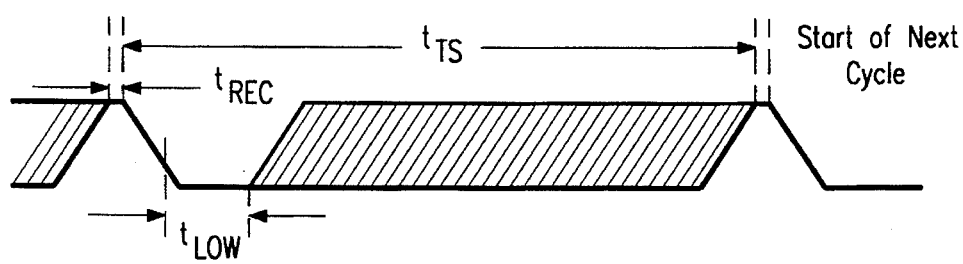
FIG. 15 shows the timing of a Read time slot on the one-wire bus, in the presently preferred embodiment.

The host generates read time slots when data is to be read from the 1-wire interface. A read time slot is initiated when the host pulls the data line from a logic high level to a logic low level. The data line must remain at a low logic level for a minimum of 1 uS and a maximum of 15 uS. This maximum time of 15 uS includes the time required for the data line to pull up to a high level after it is released. The state of the 1-wire data line must be read by the host within 15 uS after the start of the read time slot. After this time, the state of the data is not guaranteed (see FIG. 15). All read time slots must be a minimum of 60 uS in duration with a minimum of a 1 uS valid access recovery time between individual read time slots.

1-Wire Protocol

The 1-wire protocol can be viewed as having three distinct layers. These layers are the Presence Detect layer, the Reset layer, and the Command layer.

Presence Detect

Figure 16:
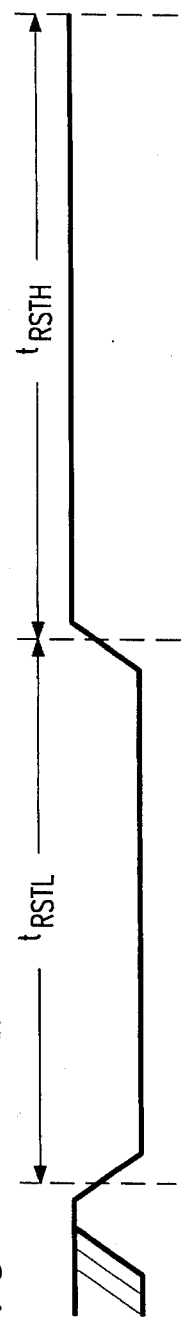
FIG. 16 shows the timing of reset pulse operations, on the one-wire bus, in the presently preferred embodiment.
Figure 17:
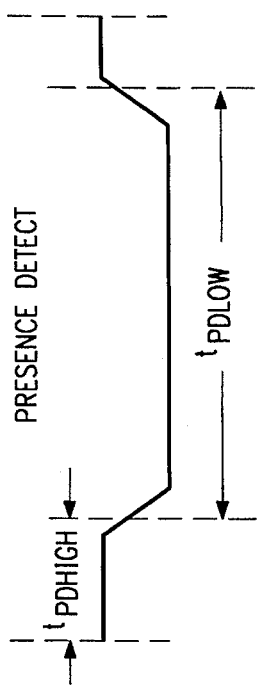
FIG. 17 shows the timing of the presence-detect operations (in relation to the reset), on the one-wire bus, in the presently preferred embodiment.

The presence detect layer is used to signal to a host device that a new device has been attached to the 1-wire port. The 1-wire port from the host remains at a logic high level during quiescent times between read and write time slots. This high time must be present for a minimum of 15 uS before the new device can assert a presence detect signal. The presence detect signal will be a logic low level asserted by the newly attached device which remains low for a maximum of 240 uS and is then released (see FIG. 16). This low logic level can be detected by the host and used as an interrupt condition for the host processor.

Device Reset

The Reset layer is used to reset the attached 1-wire devices. This allows the host to place the 1-wire device or devices into a known state at any time. The reset signal consists of a logic low level asserted by the host for a minimum of 480 uS. After this, the host must release the 1-wire signal line and allow it to rise to a logic high level. This high logic level must be maintained by the host for a minimum of 480 uS before any data can be exchanged. During this logic high time, any device present on the 1-wire signal line will assert its presence-detect waveform.

1-Wire Commands

There are four commands which can be issued by the host on the 1-wire port. These are:

1) [33 hex] read ROM data
2) [55 hex] match ROM data
3) [F0 hex] search ROM data
4) [CC hex] pass-through mode Read ROM Data Upon recognition of the command word [33 hex], the DS1205 is ready to respond to the next eight read time slots with the Type Identifier number. This number is a hexadecimal 02 and is unique to the DS1205 part. After receipt by the host of the Type Identifier number, the DS1205 is ready to output the unique 48-bit serial number contained within the device. The host must issue 48 read time slots to retrieve this number. Following the 48-bit serial number is an eight-bit Cyclic Redundancy Check (CRC) value. This CRC value has been calculated over the Type Identifier and Serial Number, 56 bits total, using the following polynomial:

$$p(x)=x^2+x^3, \text{ assuming } x0=>LSB$$

This calculated value is then lasered into the part at the time of manufacture. To read the CRC value, the host must issue eight additional read time slots.

Match ROM Data

The Match ROM data command is used as a device select when multiple 1-wire devices are connected to a single bus. This command allows the host to address any one of the multiple 1-wire devices on an individual basis. To do a Match ROM data command, the host must issue the command [55 hex] to the device with eight write time slots. Following the command byte, the host must write the desired device's Type Identifier, serial number, and CRC byte. If all of these values match the data stored internally in the ROM, the DS1205 can now be accessed using the standard DS 1205 commands and protocol. If any of the bit values transmitted by the host fail to match the ROM data pattern, the access will be terminated. To return from a pattern fail condition, the host must issue a Reset command:

| Type ID | 48-bit Serial Number | CRC | transmit ⟶

Search ROM Data

The Search ROM data command allows the host 1-wire device to poll efficiently to determine the unique ROM address of all devices on the 1-wire bus. In this mode, each of the bits of the ROM data requires three time slots on the 1-wire bus. The first two time slots are read time slots in which the DS1205 transmits back to the host the value of the ROM bit followed by its complement. The third time slot is a write time slot in which the host supplies its desired value for the ROM bit. The DS1205 then compares the desired value with the actual ROM bit. If they disagree, the DS1205 will go to a high impedance state until a RESET is issued by the host. If the bits agree, the DS1205 increments its internal counter to point to the next bit in the ROM data and then repeats the same set of three time slots for the next bit. If all bits of the ROM are matched correctly, the host may access the DS1205 with the standard command structure for the part.

Example of a ROM Search

The following example of the ROM search process assumes two different DS1205s are connected to the same 1-wire bus. The ROM data of the two DS1205s begins as shown:

| | |
|---|---|
| ROM0- | 00110101 . . . |
| ROM1- | 00010001 . . . |

The search process is as follows:

1) The host begins by resetting all devices present on the 1-wire bus.

2) The host will then issue the Search ROM Data command on the 1-wire bus.

3) The host executes two read time slots and receives a zero bit followed by a one bit. This indicates that all devices still coupled have zero as their first ROM bit.

4) The host executes a write zero time slot as the third slot in the set of three. This action keeps ROM2 and ROM1 coupled.

5) The host executes two read time slots and receives a zero bit followed by a one bit. This indicates that all devices still coupled (ROM2 and ROM1) have a zero as their second ROM bit.

6) The host will executes a write zero time slot as the third time slot to keep ROM2 and ROM1 coupled.

7) The host executes two read time slots and receives two zero bits. This indicates that both one bits and zero bits exist as the third bit of the ROM I.D.'s of the devices coupled.

8) The host executes a write zero time slot as the third bit. This decouples ROM2, leaving only ROM1 still coupled.

9) The host reads the remainder of the ROM bits for ROM1 using three time slots for each bit. After this, the host can communicate to the underlying logic, if desired. This completes the first ROM I.D. search pass, in which one of the devices was found.

10) The host starts a new ROM search sequence by repeating steps 1 through 7 above.

11) The host supplies a write one time slot as the third bit. This decouples ROM1, leaving only ROM2 still connected.

12) The host reads the remainder of the ROM I.D. bits for ROM2 and communicates with the underlying logic, if desired.

If more devices are present on the 1-wire, the same structure as presented above will be used to determine the uniqure ROM I.D. of each attached device. As soon as multiple devices are detected, a series of writes will be used to disable that branch in the search path.

Note the following:

The host learns the unique address (ROM data pattern) of one 1-wire device on each ROM SEARCH operation. The time required to derive the part's unique address is:

$$960 \text{ uS} + [8 + 3 \times 61 \text{ uS}] \times 61 \text{ uS} = 13.16 \text{ mS}$$

The host is therefore capable of identifying 75 different 1-wire devices per second.

Additionally, the data obtained from the two read time slots of each set of three time slots have the following interpretations:

00—There are still devices attached which have conflicting bits in this position.

01—All devices still coupled have a zero bit in this bit position.

10—All devices still coupled have a one bit in this bit position.

11—There are no devices attached to the 1-wire bus. (This is an error condition).

Pass-thru Mode

The Pass-Thru command is used to allow a host connected to the 1-wire bus to gain access to the DS1205 directly. It can be used only when there is one DS1205 on the 1-wire bus. This command bypasses the serial number internal to the DS1205 and allows the host to directly control the DS1205 with the DS1205 commands and protocol.

3-Wire Bus

The 3-wire bus is comprised of three signals. These are the RST\ (reset) signal, the CLK (clock) signal, and the DQ (data) signal. All data transfers are initiated by driving the RST\ input high. The RST\ signal provides a method of terminating a data transfer.

Figure 18:
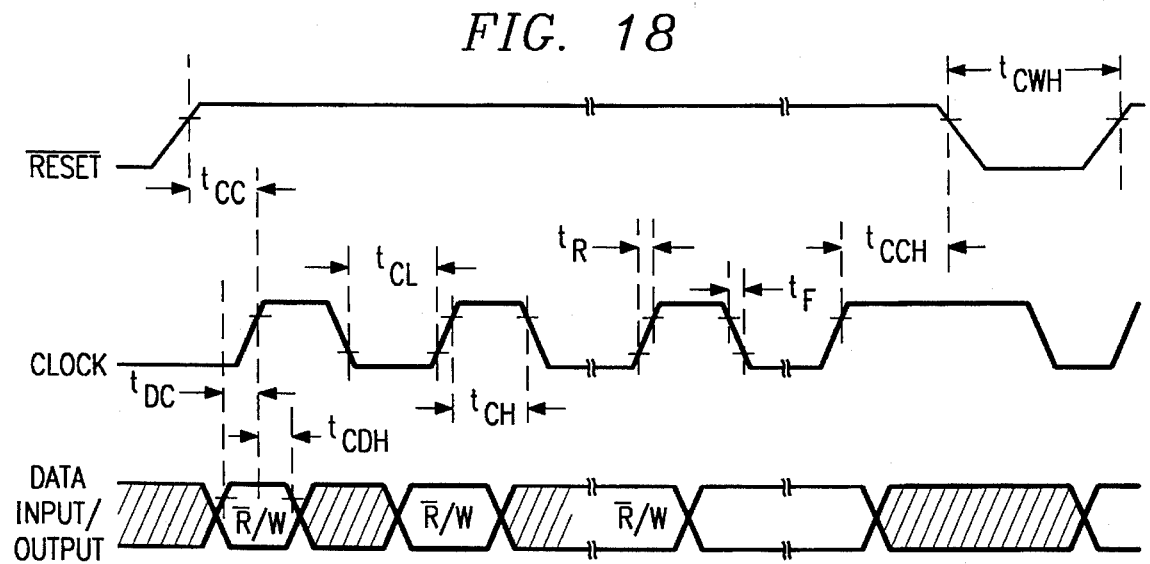
FIGS. 18 and 19 show the timing of data transfers on the three-wire bus, in the presently preferred embodiment.
Figure 19:
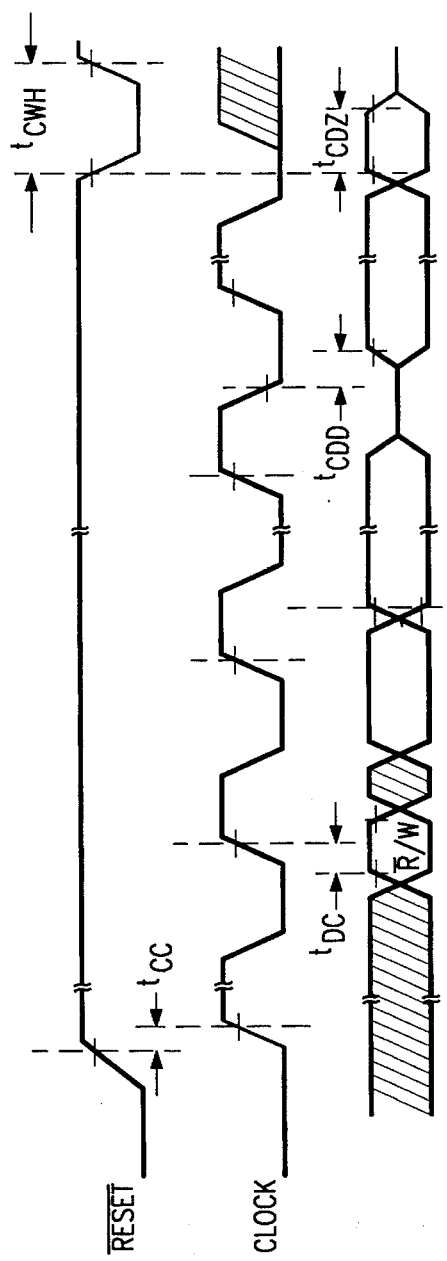

A clock cycle is a sequence of a falling edge followed by a rising edge. For data inputs, the data must be valid during the rising edge of a clock cycle. Command bits and data bits are input on the rising edge of the clock and data bits are output on the falling edge of the clock. All data transfers terminate if the RST\ is low and the DQ pin goes to a high impedance state. When data transfers to the DS1205 are terminated by the RST\ signal going low, the transition of the RST\ going low must occur during a high level of the CLK signal. Failure to ensure that the CLK signal is high will result in the corruption of the last bit transferred. Data transfers are illustrated in FIGS. 18 and 19 for normal modes of operation.

1-Wire/3-Wire Arbitration

The DS1205 can utilize both the 1-wire and the 3-wire busses simultaneously. Neither input bus has priority over the other. Instead, if both inputs are being used, the signal arriving first will take precedence. More simply, if the 1-wire interface becomes active before the 3-wire interface, all communications will take place on the 1-wire bus. The 3-wire bus will be ignored in this case. The same condition occurs for the 1-wire interface if the 3-wire interface becomes active first.

Thus, some significant features of the presently preferred embodiment—not all of which are claimed to be separately novel—include the following: Four addressable read/write data partitions; Three secure read/write data partitions of 384 bits each; One non-secure read/write data partition of 512 bits; Secure data cannot be deciphered by reverse engineering; Supports a hierarchical privilege system; Partitioned memory thwarts pirating; 64-bit password and I.D. fields provide a barrier against accidental key erasure; Maximum data transfer rate of 2 million bits/second; Low-power CMOS circuitry; 3-wire bus-compatible; 1-wire "touch" bus-compatible; Applications include software authorization, proprietary data, financial transactions, secure personnel areas, and systems access control.

Preferred Package

Figure 21:
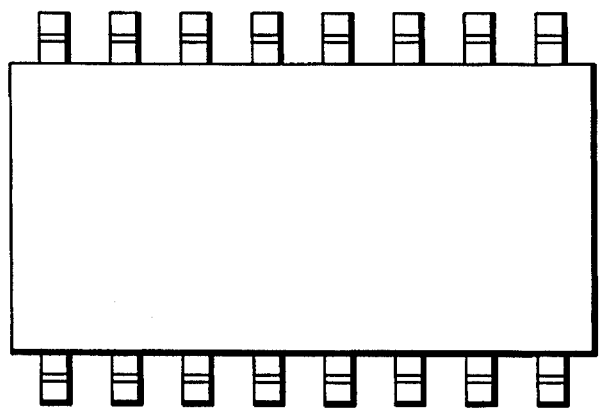
FIG. 21 shows the preferred package of the chip of the presently preferred embodiment.

The preferred packaging embodiment is an 8-pin SOIC package, as shown in FIG. 21. However, of course, a wide variety of other package types can be used instead if desired.

Chip Layout

Figure 20:
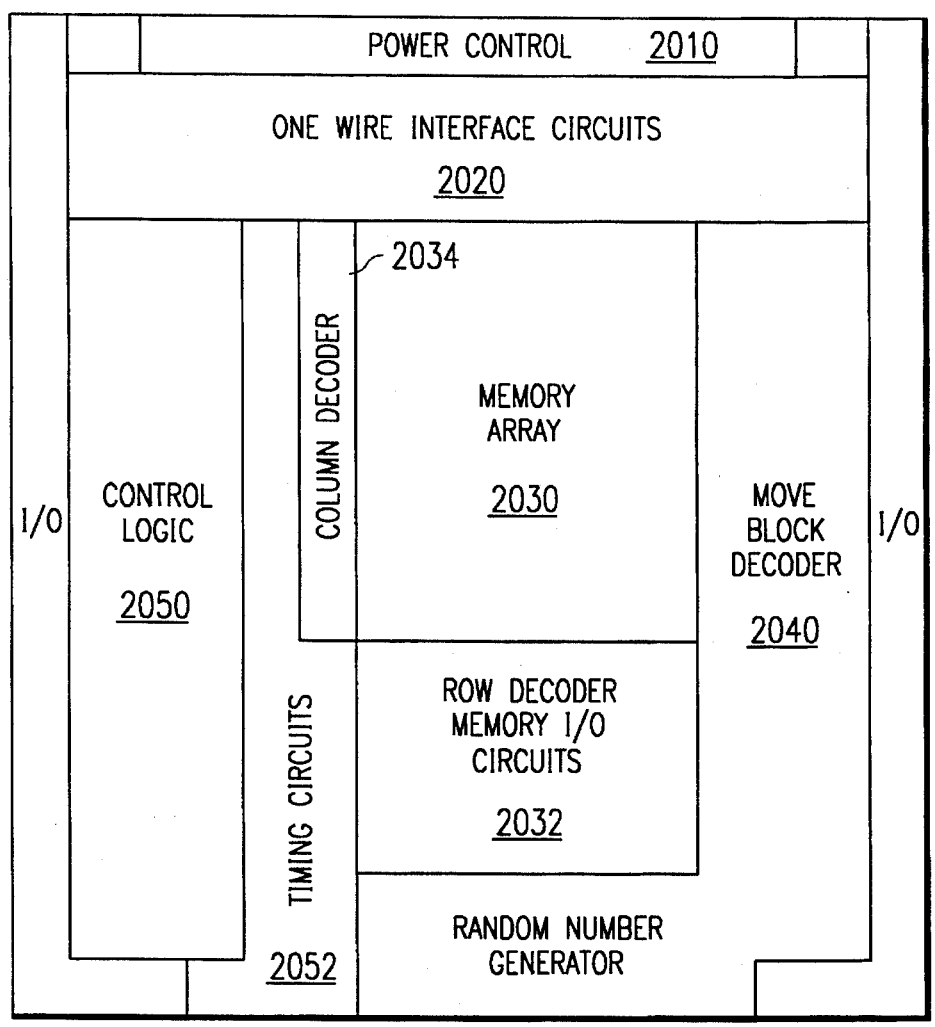
FIG. 20 shows the overall layout of the chip of the presently preferred embodiment.

FIG. 20 shows the overall layout of the chip of the presently preferred embodiment.

At the center of the chip is a low-power memory array 2030. In the presently preferred embodiment, this is an array of 32 rows by 64 columns of conventional 6-transistor full-CMOS SRAM cells.

The column decoder logic 2034 is conventional (for a serially accessed RAM). However, the row decoder logic 2032 includes memory I/O circuits, and specifically a lookup RAM, which provides remapping of memory blocks as described more fully below.

Power control circuitry 2010 is shown more fully in FIG. 24, and is discussed below.

Figures 25A, 25B:
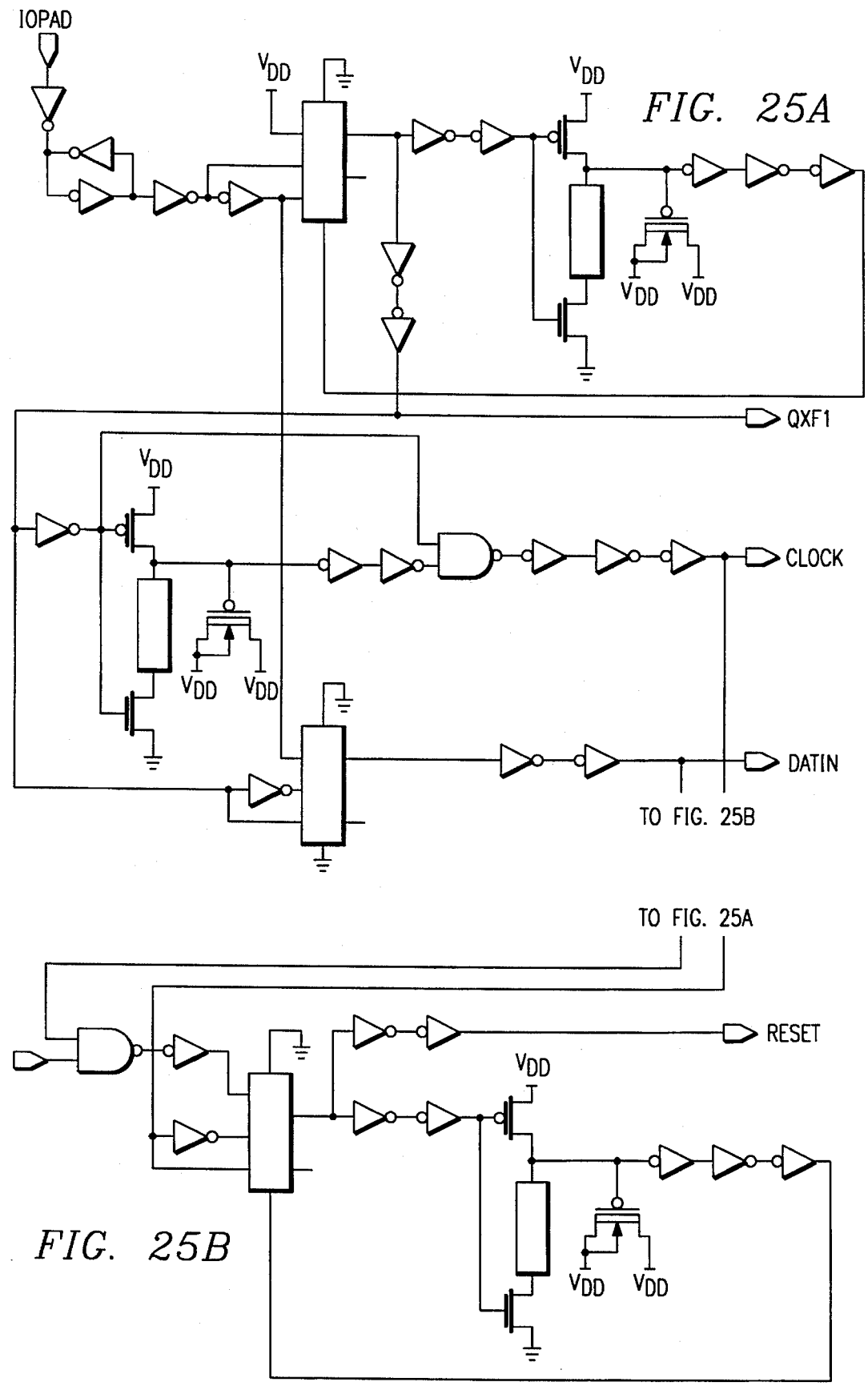
FIGS. 25A and 25B are two parts of a single figure which shows the one-wire-to-three-wire conversion circuit used, in the presently preferred embodiment, in the integrated circuit of FIG. 20.

One-wire interface circuitry 2020 provides translation from the one-wire interface protocol to a standard 3-wire interface, and is shown more fully in FIGS. 25A and 25B.

The move-block decoder and random number generator circuitry 2040 are shown more fully in FIGS. 25A and 25B, and are discussed in detail below.

The control logic 2050 contains a shift register, and decode logic, for decoding a functional command word (such as "Get Secure Data" or "Set Secure Data"). Thus, control logic 2050 and timing circuits 2052 are essentially the same as are commonly used in any chip accessed by a serial port.

If the functional command word is "Move Block," then a further specifier must be transmitted to specify which block is to be moved. This further specifier is decoded by a different shift register, in the move block decoder 2040, described below in detail. This same shift register in the move block decoder 2040 is also used for repeatable pseudo-random number generation, as will be described below.

Specific Circuitry

Some significant features of circuitry in the chip of the presently preferred embodiment will now be described in further detail.

Pseudo-Random Number Generation

FIGS. 22A through 22D show the circuitry which provides pseudo-random number generation.

A chain of D-flops 2210 provides a basic shift register structure. However, note that the connection is occasionally broken by an XOR gate 2220, which combines the propagating logic state with an input from the feedforward line B or the feedback line A. These flip-flops have slightly larger output drivers than normal, in order to drive the decoding logic.

Line B is a feedforward line, which carries forward a state from an early stage for combination into various other nodes along the chain. Line A is a feedback line, which carries back a state from a later stage for combination into various other nodes along the chain.

However, note that the feedforward and feedback lines are only enabled when signal EN_RND_DATA ("enable random data") is active.

When the EN_RND_DATA signal is not active, the combination of gates 2230 provides a simple combinatorial decoder. This combinatorial logic provides decoding of the block specifier which is used in a block move operation. The 9 possible block destinations are indicated by BLOCK_0, BLOCK_1, etc., and XFER_ALL (which indicates that the entire scratchpad is to be copied to the target subkey).

Thus, the structure shown has a double purpose: when a comparator (not shown) detects a password mismatch, the line EN_RND_DATA is activated to send out garbage. If line EN_RND_DATA is not activated, this shift register structure can operate as a decoder to determine block address.

Note that, if the decoding structure shown detects a mismatch between the specified value and the target subkey's password, signal MBINVB goes active.

When scrambled data is clocked out of the structure shown, it appears on line RND_DAT_OUT. A multiplexer (not shown) selects this data stream for output if needed.

The structure shown differs from the actual manufactured embodiment of the DS1205 chip in two respects. First, in the structure shown the XOR gates 2220 have been reconfigured. The structure shown will work perfectly well, and disclosure of the actual manufactured structure would jeopardize the security of that structure.

Secondly, in the structure shown, an input signal SCRMBL enables operation of the random number generator whenever a Get Secure Data operation is requested. Thus, if scrambling is required, the shift registers already contain scrambled data when data output is requested. By contrast, in the actual manufactured embodiment, the EN_RND_DATA signal is not enabled until after all 64 bits have been read in, and the preceding comparator indicates whether a mismatch is present. Either version will work perfectly well, but the version pictured is believed to be slightly preferable.

Block Assignment Pointer Management

Figure 23A:
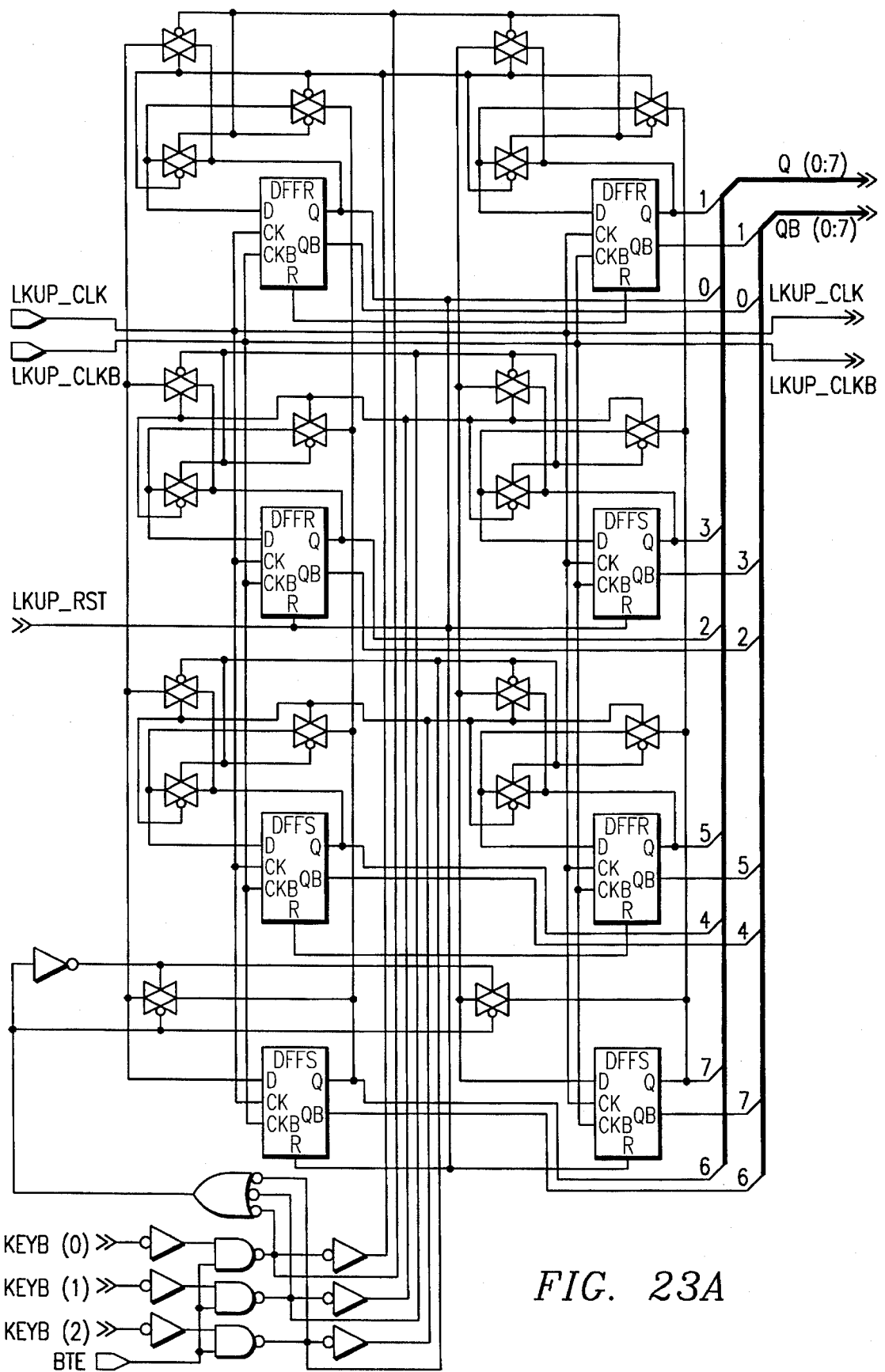
FIGS. 23A, 23B, and 23C show the circuitry used, in the presently preferred embodiment, for holding block pointer assignments and for checking that the block pointers are mutually consistent.
Figure 23B:
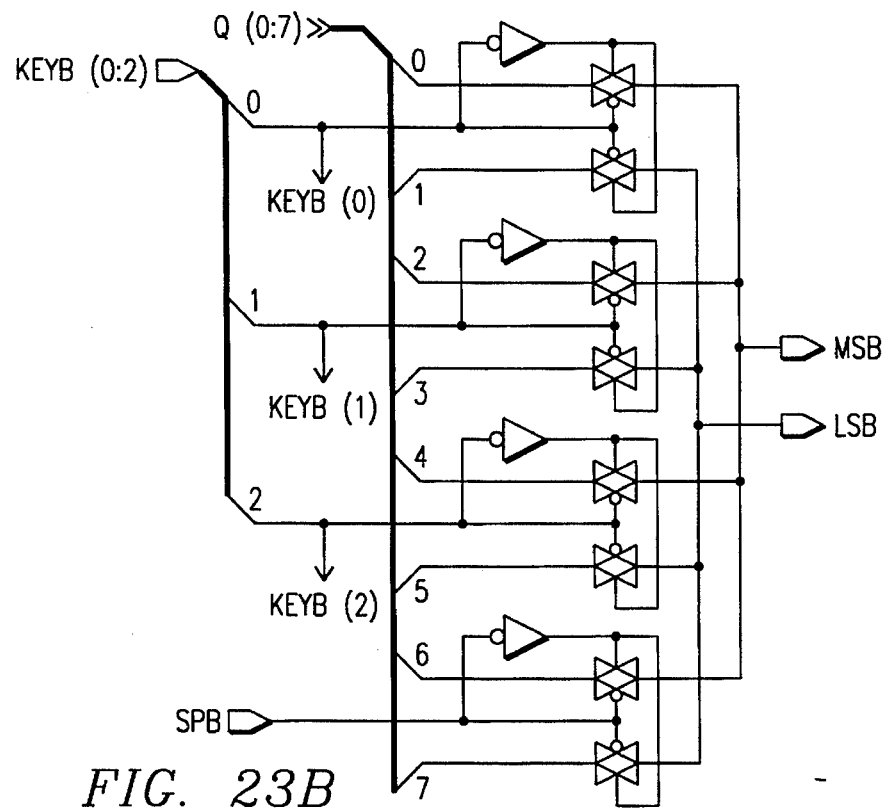
Figure 23C:
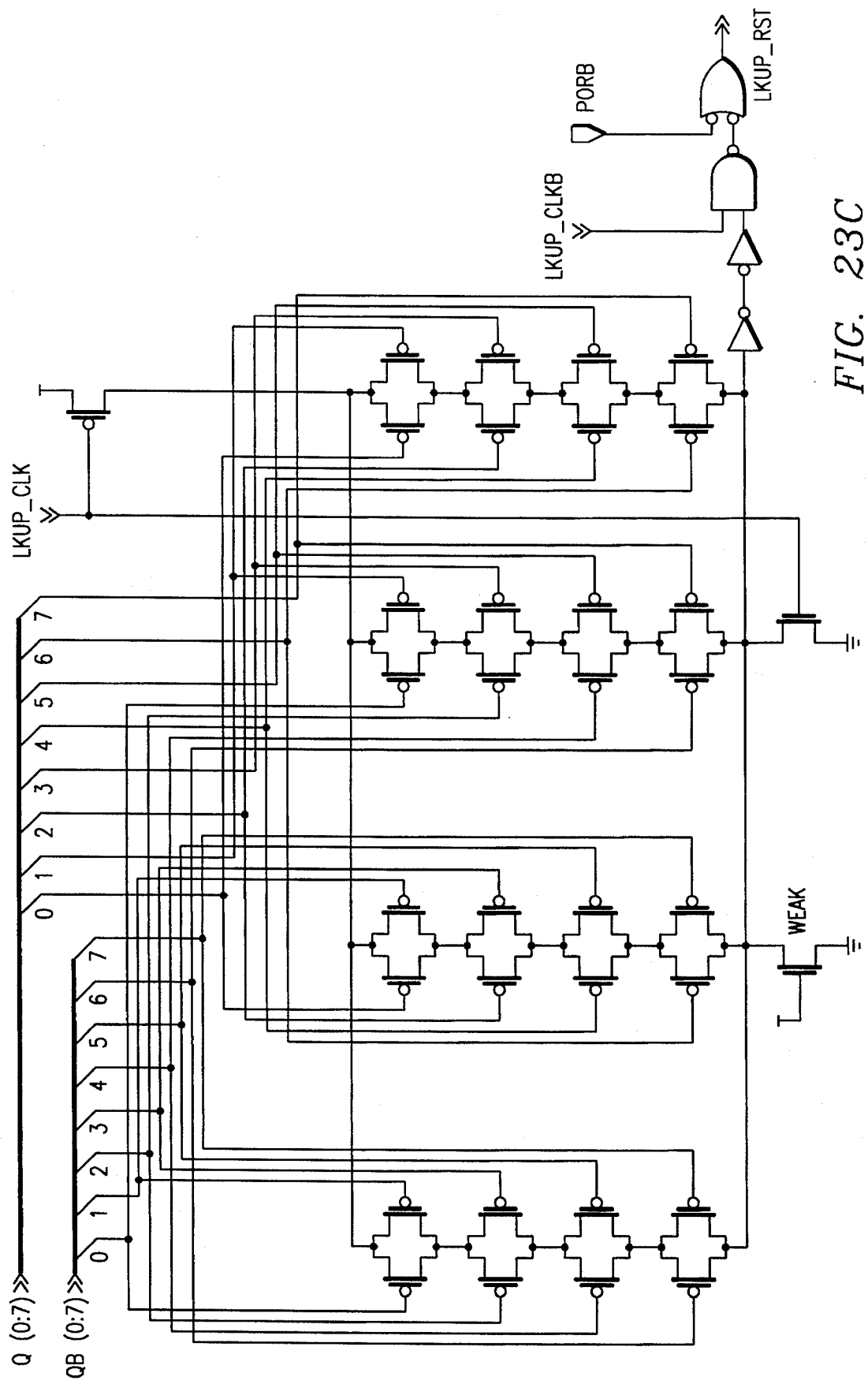

FIGS. 23A through 23C show details of the translation register and associated logic.

FIG. 23A generally shows a key portion of the translation register. The logic shown is replicated 8 times (once for each segment of the key). For example, the register set for block 3 contains the row address for subkeys 0, 1, and 2, and the scratch pad.

When a move block command is specified, these registers will simply swap addresses between the scratchpad registers and the registers associated with the selected key.

FIG. 23B shows output multiplexing logic associated with the circuitry of FIG. 23A. This circuitry multiplexes the address for the selected subkey onto predecoded row lines MSB and LSB.

FIG. 23C is the illegal state detect circuit. This is an array of pairs of PMOS devices, wired to detect any redundant state in the registers of FIG. 23A. If any such state is detected, signal LKUP_RST is driven active (high), to force the registers of FIG. 23A to a predetermined default state.

Memory Array

The memory array itself, in the presently preferred embodiment, is an entirely conventional structure of 6-transistor full-CMOS SRAM cells.

Power Source Selection

Figure 24:
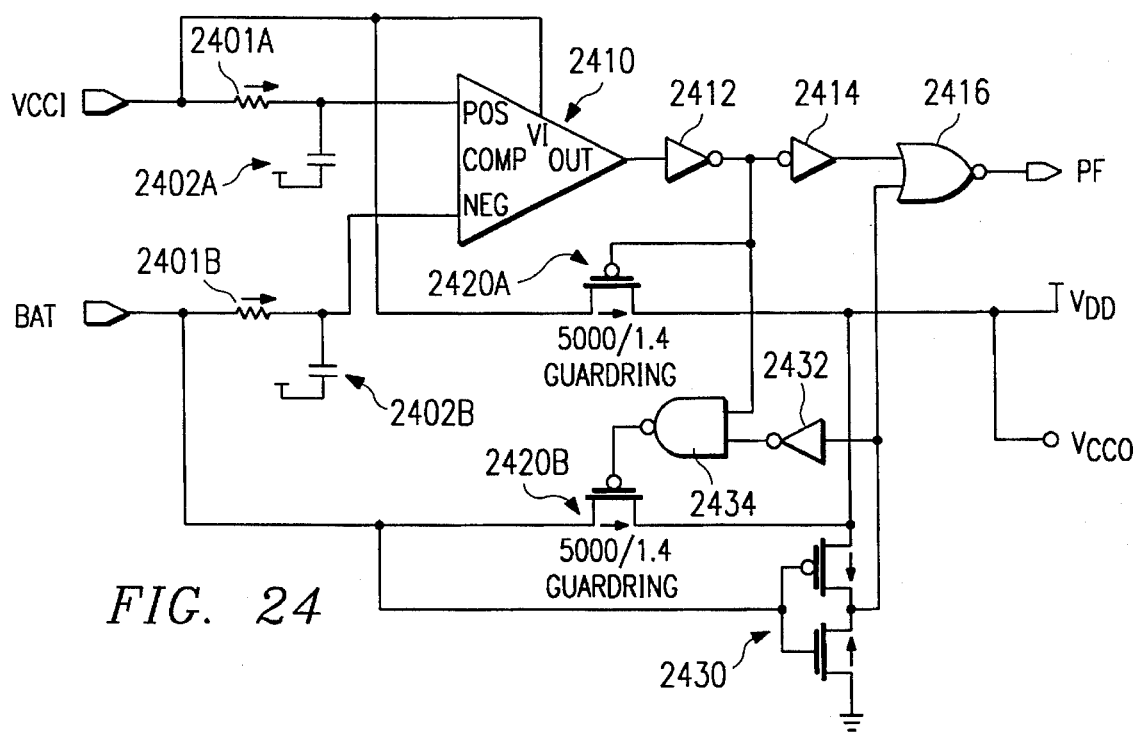
FIG. 24 shows the circuitry used for selection of the power supply input, in the presently preferred embodiment.

FIG. 24 shows the circuitry used, in the presently preferred embodiment, for power source selection.

Input VCCI is filtered by resistor 2401A and capacitor 2402A. Input BAT is filtered by resistor 2401B and capacitor 2402B. Comparator 2410 compares the filtered versions of the two inputs BAT and VCCI. When powered up, this comparator will provide a high output if VCCI exceeds BAT.

If the comparator 2410 provides a high output, inverter 2412 will drive a low level onto the gate of large PMOS switching transistor 2420A, which connects VCCI directly to VDD.

However, note that this comparator is powered from input VCCI, not from the on-chip power supply VDD. Thus, if VCCI is below the minimum threshold voltage for a "high" logic level, the output of the comparator will necessarily be low (even if the BAT input is even lower than VCCI), and thus VCCI will not be connected to VDD under these circumstances.

If the BAT input is higher than VCCI (and is also at least a logic "high" level), then the output of comparator 2410 will be low, and the output of inverter 2412 will be high. This will turn on the large PMOS switching transistor 2420B, IF the other input to NAND gate 2434 is also high.

However, note that BAT is also connected directly to the input of inverter 2430. If BAT is not high enough to drive the output of 2430 low, then the output of inverter 2432 will be low, and the output of NAND gate 2434 will necessarily be high. Thus, if BAT is low, the large PMOS switch transistor 2420B will always be turned off, and BAT will never be connected directly to VDD.

Thus, if both BAT and VCCI are low, neither of these pins will be connected to the on-chip power line VDD. Of course, if no pins of the chip were powered, the chip would reach a uniform potential, and would be inactive. However, if the third pin (VCCO, in the presently preferred embodiment) is connected to a battery, the chip can still be powered up. (In this case the chip will operate permanently in the battery operated mode.)

One-Wire Interface

FIGS. 25A and 25B are two parts of a single figure which shows the one-wire-to-three-wire conversion circuit used, in the presently preferred embodiment, in the integrated circuit of FIG. 20. This circuitry is a fairly straightforward implementation of the logical relationships described, and is pictured here merely for completeness.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

The presently preferred embodiment is a serial access memory, but the disclosed concepts can also be advantageously applied (although less preferably) to a random access memory.

It should also be noted that the disclosed inventive concepts can also be advantageously applied (although less preferably) to a memory which uses EEPROMS rather than SRAM cells.

As will be recognized by those skilled in the art, the innovative concepts described in the present application can be modified and varied over a tremendous range of applications, and accordingly their scope is not limited except by the allowed claims.

What is claimed is:

1. An integrated circuit, comprising:

at least one memory array containing multiple low-power memory cells arranged in rows and columns;

a command decoder, connected to decode commands requesting access to said memory array, wherein said command decoder includes a writable translation register having modifiable contents, which writable translation register defines plural one-to-one correspondences between logical memory addresses and cells of said array, with each of said one-to-one correspondences associated with a corresponding bit pattern in said register;

and wherein said command decoder aim includes hardware verification logic which monitors said translation register, and, if the bit pattern in said translation register at any time ceases to define a one-to-one correspondence between said logical memory addresses and said cells, said hardware verification logic forces a reset of said translation register, and wherein said command decoder translates access requests, in accordance with the bit pattern of said translation register, to provide a block select output; and an address decoder, connected to receive said block select output, and accordingly to select ones of said rows and columns of said cells.

2. The integrated circuit of claim 1, wherein said command decoder also screens access requests for match with a password.

3. The integrated ciructit of claim 1, wherein said command decoder also screens access requests for match with a password, and further comprises a pseudo-random number generator, which is activated to output pseudo-random numbers at an output of said array in response to said access request if said command decoder does not detect a match with the password.

4. The integrated circuit of claim 1, wherein said address decoder can serially select ones of said cells in sequence.

5. The integrated circuit of claim 1, wherein said memory cells are SRAM cells.

6. The integrated circuit of claim 1, wherein said memory cells each comprise a cross-coupled latch.

7. An integrated circuit secure memory, comprising:

at least one memory array containing multiple low-power memory cells arranged in rows and columns;

a command decoder, connected to decode commands requesting access to said memory array, said commands including password portions;

wherein said command decoder includes a writable translation register having modifiable contents, which writable translation register defines plural one-to-one correspondences between logical memory addresses and cells of said may, with each of said one-to-one correspondences associated with a corresponding bit pattern in said register;

and wherein said command decoder also includes verification means which monitors said translation register, and, if the bit pattern in said translation register at any time ceases to define a one-to-one correspondence between said logical memory addresses and said cells, said verification means forces a reset of said translation register, and wherein stud command decoder translates access requests, in accordance with the bit pattern of said translation register, to provide a block select output;

and wherein said command decoder checks password portions of said access requests, and provides said block select output only if the password portion is correct; and an address decoder, connected to receive said block select output, and accordingly to select ones of said rows and columns of said cells.

8. The integrated circuit of claim 7, wherein said memory cells each comprise a cross-coupled latch.

9. An integrated circuit, comprising:

at least one memory array containing multiple low-power memory cells arranged in rows and columns;

a command decoder, which command decoder includes a translation register having modifiable contents, which translation register defines plural one-to-one correspondences between logical memory addresses and cells of said array, with each of said one-to-one correspondences associated with a corresponding bit pattern in said register; and wherein said command decoder also includes verification means which monitors said translation register, and if the bit pattern in said translation register at any time ceases to define a one-to-one correspondence between said logical memory addresses and said cells said verification means forces a reset of said translation register.

10. The integrated circuit of claim 9 which further comprises hardware verification logic which monitors said address decoder and, if the bit pattern in said address decoder at any time ceases to define a one-to-one correspondence between said logical memory addresses and said cells, said hardware verification logic forces a reset of said address decoder.

* * * * *